United States Patent
Majumdar

(10) Patent No.: US 10,536,515 B2
(45) Date of Patent: Jan. 14, 2020

(54) METHOD AND PROGRAM PRODUCT FOR ROBOT COMMUNICATIONS

(71) Applicant: Kausik Majumdar, San Ramon, CA (US)

(72) Inventor: Kausik Majumdar, San Ramon, CA (US)

(*) Notice: Subject to any disclaimer, the term of this patent is extended or adjusted under 35 U.S.C. 154(b) by 408 days.

(21) Appl. No.: 15/390,256

(22) Filed: Dec. 23, 2016

(65) Prior Publication Data

US 2018/0183860 A1 Jun. 28, 2018

(51) Int. Cl.
*H04L 29/08* (2006.01)
*H04L 29/06* (2006.01)
*H04L 12/66* (2006.01)

(52) U.S. Cl.
CPC .......... *H04L 67/1002* (2013.01); *H04L 12/66* (2013.01); *H04L 67/16* (2013.01); *H04L 67/2842* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 7,783,777 B1* | 8/2010 | Pabla | ...................... | H04W 4/02 709/238 |
| 8,116,288 B2* | 2/2012 | Frid-Nielsen | ........ | G06Q 20/102 370/259 |
| 8,782,395 B1* | 7/2014 | Ly | ....................... | H04L 67/2842 713/153 |
| 9,014,848 B2 | 4/2015 | Farlow et al. | | |
| 9,160,609 B2* | 10/2015 | Dunbar | ............... | H04L 12/4625 |
| 2009/0138547 A1* | 5/2009 | Boudreau | ............... | H04W 4/08 709/203 |
| 2010/0144330 A1* | 6/2010 | Ahlin | ...................... | H04L 67/06 455/418 |
| 2014/0047059 A1* | 2/2014 | Brownlow | .......... | H04L 67/1074 709/213 |
| 2014/0133456 A1* | 5/2014 | Donepudi | ............. | H04W 88/10 370/331 |
| 2015/0334773 A1* | 11/2015 | Cui | ....................... | H04W 28/16 370/328 |
| 2016/0055677 A1 | 2/2016 | Kuffner | | |
| 2016/0309485 A1* | 10/2016 | Yoon | ................... | H04W 72/085 |

* cited by examiner

*Primary Examiner* — Kenny S Lin
(74) *Attorney, Agent, or Firm* — Ariel S. Bentolila; Bay Area IP Group, LLC

(57) ABSTRACT

A method and program product includes communicating with a mobile edge computing server as a client. The mobile edge computing server is configured to be in control of a heterogeneous domain. A request to join the heterogeneous domain of the mobile edge computing server is made. The mobile edge computing server is configured for determining an on-board cache size of the requesting client, determining a download size for the requesting client, and transmitting a download to the requesting client. The download includes an application, an operating database, and a size determined by the download size. The download is received. At least one task determined by the download is executed.

13 Claims, 17 Drawing Sheets

METHOD AND PROGRAM PRODUCT FOR ROBOT COMMUNICATIONS

FEDERALLY SPONSORED RESEARCH OR DEVELOPMENT

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to cloud based communication. More particularly, certain embodiments of the invention relate to cloud based client communication.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Conventional robots or automated machines/devices may be built to perform various tasks. Some conventional robots may include an on-board central processing unit (CPU) with a set amount of memory to perform processing and thus a set amount of processing power. The conventional robots may possibly learn by being pre-programmed on an on-board memory or possibly by being programmed for observation and updating finite state machines of the CPU. It may be contemplated that this process may take a multiplicity of repetitions before a learned processing may become efficient. It may further be contemplated that conventional robots may contain costly and possibly unreplaceable databases due to particular learning updates that may be untimely to replicate or may not be able to be replicated at all. One may expect that the failure of the onboard memory may result in the loss of the database. In a case that a conventional robot may develop computing complications, recovery patch software may need to be uploaded directly into the robot's CPU. It may also be contemplated that a conventional, stand-alone robot may be vulnerable to security issues from an unauthorized user, and a considerable amount of resources may be needed to monitor a multiplicity of stand-alone robots, each performing different tasks. The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that conventional robot systems may include a conventional mobile robot having a controller executing a control system for possibly controlling operation of the robot, wherein a conventional cloud computing service may be in typical communication with the controller of the robot, and a remote computing device may also be in typical communication with the cloud computing service. Furthermore, outputs of conventional robot sensors, such as camera feeds, vision sensors, etc., may be typically provided to the computing device, via the cloud computing service, which may process the outputs and may typically communicate instructions back to a robot, via the cloud computing service, to possibly enable the robot to perform functions.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
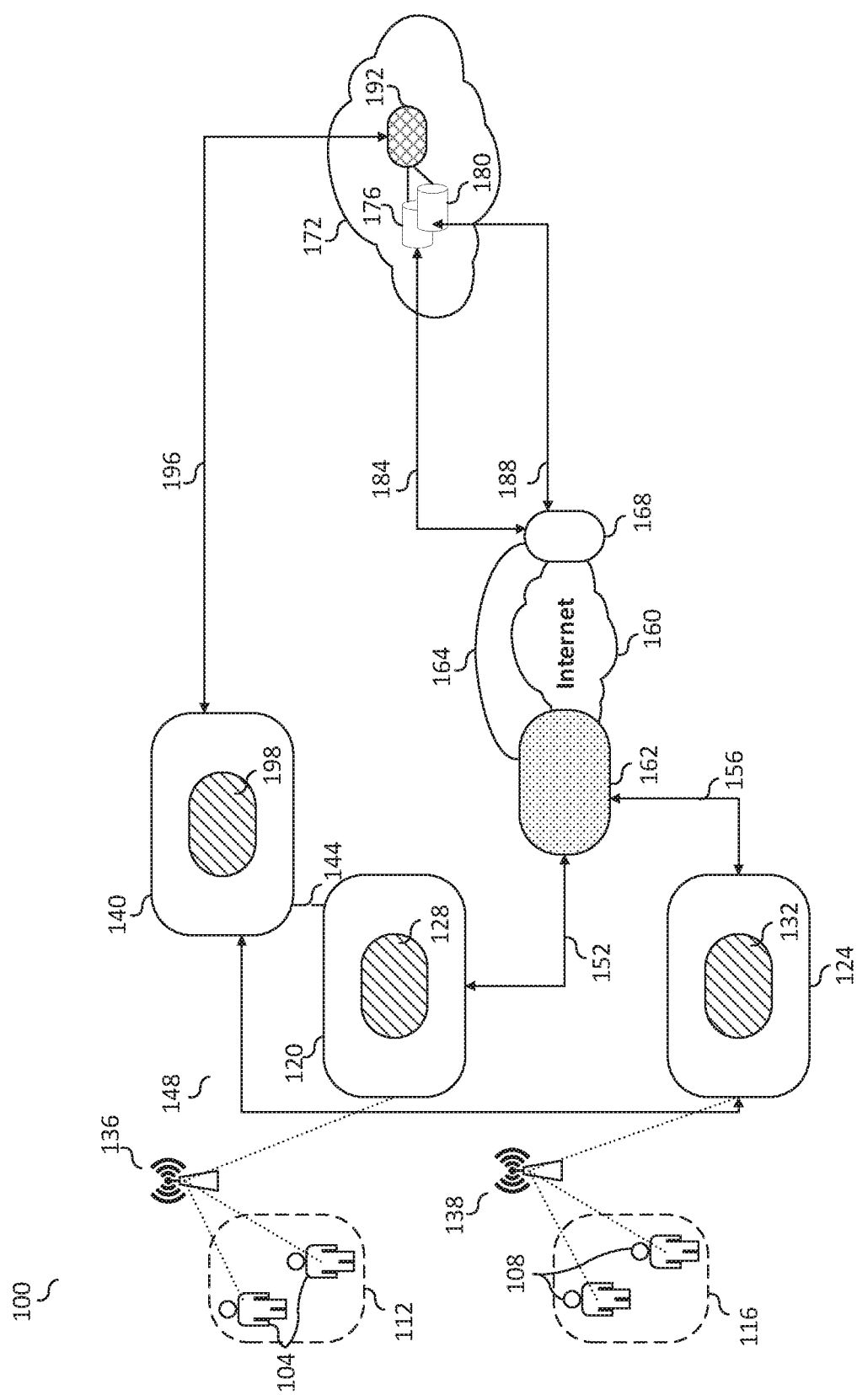
FIG. 1 illustrates an exemplary communication system architecture, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see *Ex parte Mallory*, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. Jul. 3, 1997) (unpublished) *Hybridtech* v. *Monoclonal Antibodies, Inc.*, 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.*, 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.*, 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forward most point of the upper or outsole and the rearward most point of the upper or outsole.

Similarly, the term 'substantially' is well recognized in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.*, 347 F.3d 1314, 1322 (Fed. Cir. 2003); *Epcon Gas Sys., Inc.* v. *Bauer Compressors, Inc.*, 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.*, 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.*, 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.*, 279 F.3d 1022 (Fed. Cir. 2002) (construing the terms "substantially constant" and "substantially below"); *Zodiac Pool Care, Inc.* v. *Hoffinger Indus., Inc.*, 206 F.3d 1408 (Fed. Cir. 2000) (construing the term "substantially inward"); *York Prods., Inc.* v. *Cent. Tractor Farm & Family Ctr.*, 99 F.3d 1568 (Fed. Cir. 1996) (construing the term "substantially the entire height thereof"); *Tex. Instruments Inc.* v. *Cypress Semiconductor Corp.*, 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac*, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.*, 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.*, 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.*, 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.*, 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.*, 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.*, 66 F.3d 1211, 1217, 36 USPQ2d 1225, 1229 (Fed. Cir. 1995); see, e.g., *Andrew Corp.* v. *Gabriel Elecs. Inc.*, 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory*, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable for) perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see *Norian Corp.* v *Stryker Corp.*, 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

It may be contemplated that cloud communication may be used for a multiplicity of practical applications, for example, and without limitation, at least stand-alone/individual robotics. It may further be contemplated that many uses of cloud communication may provide solutions for many challenges related to individual robotics. It may also be contemplated that improvements in at least computer learning, data analyzation, task performance, and robot to robot interaction, may be achieved by one or more ways including, for example, and without limitation, possibly maintaining databases in cloud data center servers, possibly implementing cloud computing, possibly providing an open-source/open-access platform, and possibly implementing collective robot learning and offline learning. It may be contemplated that the cloud data center servers may maintain large databases (Big Data), wherein the databases may index a global library of images, maps, and object data that may improve learning for the individual robots. Moreover, the cloud data center servers may be maintained remotely from the individual robots and thus may be protected from robotic failures. Furthermore, the use of the cloud data center servers may provide an efficient monitoring of the individual robots and a message exchange between the robots and server when the robots may be connected to each other via the cloud data center servers, and thus may improve security. It may further be contemplated that cloud computing may provide multi-core processing power that may help decrease a processing time for at least, and without limitation, parallel computing images, texts, and data, learned by individual robots. A faster processing of the data may help for example, and without limitation, directing robot action and motion planning. It may further be contemplated that robotic learning may be further improved by sharing code, data, algorithms, and hardware designs through an open-source/open-access community platform, and once the individual robots may start sharing their learning with other robots within and/or outside a domain, based on, for example, and without limitation, a data type, the robots may increase respective learning rates. It may also be contemplated that offline and on-demand human guidance may be provided for possible for evaluation, learning, and error recovery that may help robots to become more intelligent and sophisticated. Error recovery handling may become relatively easier with the use of cloud robotics. For example, and without limitation, as the individual robots may be monitored in a cloud server controller, substantially any on-demand and offline error detection may be possible in a background. Also, an operator may intervene for correction as may be needed and/or when possibly needed in a case that a controller may fail to do an auto correction.

Conventional robot systems may generally provide individual robots in typical communication with cloud computing, wherein robotic applications may typically be performed by the cloud computing. It may further be contemplated that conventional robotic systems may not include integrated individual robotic groups/domains with one or more Mobile Edge Computing (MEC) servers, wherein Mobile Edge Computing may be integrated with the cloud communication as described below. It may be contemplated that many embodiments of the present invention may provide a unique approach to cloud communication, wherein the approach may provide much more efficient and scalable systems by organizing robots into Robo domains and further connecting many of the robots of the Robo domains with one or more MEC Servers.

Many embodiments of the present invention may include integrating Mobile Edge Computing (MEC) with the cloud communication. It may be contemplated that this integration may provide many optimal practical applications for cloud robotics. In many embodiments of the present invention, one or more MEC servers may operate in close communicational proximity over one or more cellular networks (Mobile Edge), wherein the proximity may be a distance with respect to one or more cellular base stations. In many embodiments, the one or more MEC servers may also operate over wireless networks, wired networks, internet, wide area networks (WAN), local area networks (LAN), or any combination thereof, and may perform many robotic computing applications. In some embodiments, the one or more MEC servers may provide location aware service to a specific robotics application. In many embodiments implementation of the one or MEC servers may virtualize individual robots and may scale/distribute one or more robotics applications. In some embodiments, a latency for robotics applications may be decreased by performing computations over the one or more networks. In many embodiment of the present invention, the integration may provide connecting to an IP/MPLS network, which may help to maintain shadow robotics applications ran in a data center (DC) cloud. Further integration with a MEC controller may help to perform the analytics for robotics applications and may push data in the DC cloud. In many embodiments, the one or more MEC severs may also provide an infrastructure to operably couple a multiplicity of robotic domains by connecting through a MEC gateway, wherein a robotic domain may be a subset of a given Robo application with individual robots that may be assigned to the application. By way of illustrative example, and without limitation, exemplary robots may be agricultural robots, wherein agricultural robots may be robots which may perform tasks related to agricultural work and thus may belong to an agricultural Robo application. In a further exemplary, and without limitation, case, multiple groups of agricultural robots, among the agriculture Robo application may be created based on their location. Robots in a certain location, connected through a same network and performing same robotics applications may be of a same Robo domain and may belong to a same Robo application. In some embodiments, substantially all robot to robot communication may occur through the one or more MEC servers running Robo applications and possibly re-directing the communication. Furthermore, in some embodiments of the present invention, the one or more MEC servers may perform selective download to the robots to possibly make them relatively light-weight. The robots are light weight may mean the robots may not built as super intelligent. The intelligence may be built inside the Mobile Edge/MEC Servers as described herein. The MEC servers may control the robots and push the intelligence or download robotic application software into the robots. As the robots may not pre-built with super intelligence software on board they may no longer be costly, their manufacturing cost may become much cheaper. The robots may not need to be tied with any robotic applications while building the robots. Depending upon the physical robotic structure, the same robot may be used for different Robotic applications. In many embodiments, utilizing the one or more MEC servers remotely over network may provide stronger security. It may be contemplated that various features of the integrated MEC cloud robotics, may be used in combination to potentially make individual robots relatively simple enough to reduce a cost and also possibly speed up production. Many more new benefits may become readily recognized by those skilled in the art in light of the teachings of Mobile Edge Computing being integrated with Cloud Robotics as described below.

In many embodiments of the present invention, a communication system may include one or more individual clients within a client domain, wherein the one or more individual clients may be operably coupled with a MEC server and a MEC controller. Furthermore, in many embodiments, a multiplicity of client domains may be operably coupled via a MEC gateway. In some embodiments, a computing processing workload of the one or more individual clients may be reduced by running operating applications in the MEC server and thus offloading the workload from the client. In many embodiments of the present invention, the communication system may further include a one or more individual clients that may belong to particular client domains in operable communication with one or more MEC servers and in operable communication with one or more MEC controllers, wherein data may be downloaded to the individual clients via the one or more MEC servers and the one or more MEC controllers. In some embodiments, a MEC server may maintain efficient connections with a multiplicity of clients, wherein a MEC controller may further create a master view of a multiplicity of MEC servers and thus may aid in the maintaining of the efficient connections. In many embodiments, the communication system may further be configured to provide optimal load balancing for the MEC servers, wherein the MEC servers may be further configured to execute selective and/or full download of one or more operating applications to one or more individual clients based on an on-board cache size of the one or more individual clients. In many embodiments of the present invention, a communication system may also include a MEC server that may aid in internal domain client communication. Furthermore, in some embodiments a communication system may be connected to one or more existing IP/MPLS network so that one or more MEC servers may maintain one or more operating application shadow databases (DB)s in one or more data center cloud servers, wherein a MEC controller may also be connected to the one or more data center cloud servers to maintain an operating application controller master database. In many embodiments of the present invention a client may include a robot, an automated computing device, a GUI enabled general purpose computer, sensors, a vehicle configured with automated processes such as, and without limitation, an automated airplane, an automated motor vehicle, an automated train, an automated aquatic vehicle, an automated helicopter, an automated drone, or other general connected devices with on-board memory and processors to download the application for the connected devices and to process the actions.

As will be described in some detail below with reference to the figures, in many embodiments of the present invention a communication system may provide auto discovery and inter-domain communication abilities for cloud communication that may be integrated with mobile edge computing (MEC), wherein one or more client domains may be operably coupled with one or more MEC controllers, one or more MEC servers and one or more MEC gateways. In some embodiments of the present invention one or more individual clients may be automatically discovered by and connected with one or more MEC servers, wherein one or more operating applications may be downloaded to the one or more individual clients. In many embodiments of the present invention, a multiplicity of clients may be grouped together in the one or more client domains, wherein clients that may be grouped to a particular client domain may also be governed by a particular operating application, furthermore, an operating application may include executable computer-readable instructions that may be executed by processors of the one or more clients, which may cause the clients to perform tasks and operations related to for example, and without limitation, defense, agriculture, manufacturing, flight, construction, maintenance, ground movement, aquatic movement, signal processing, data collection, data transmission, or any combination thereof which may be assigned to the one or more clients in order for the one or more clients to possibly perform particular respective tasks related to the particular operating application.

Figure 2:
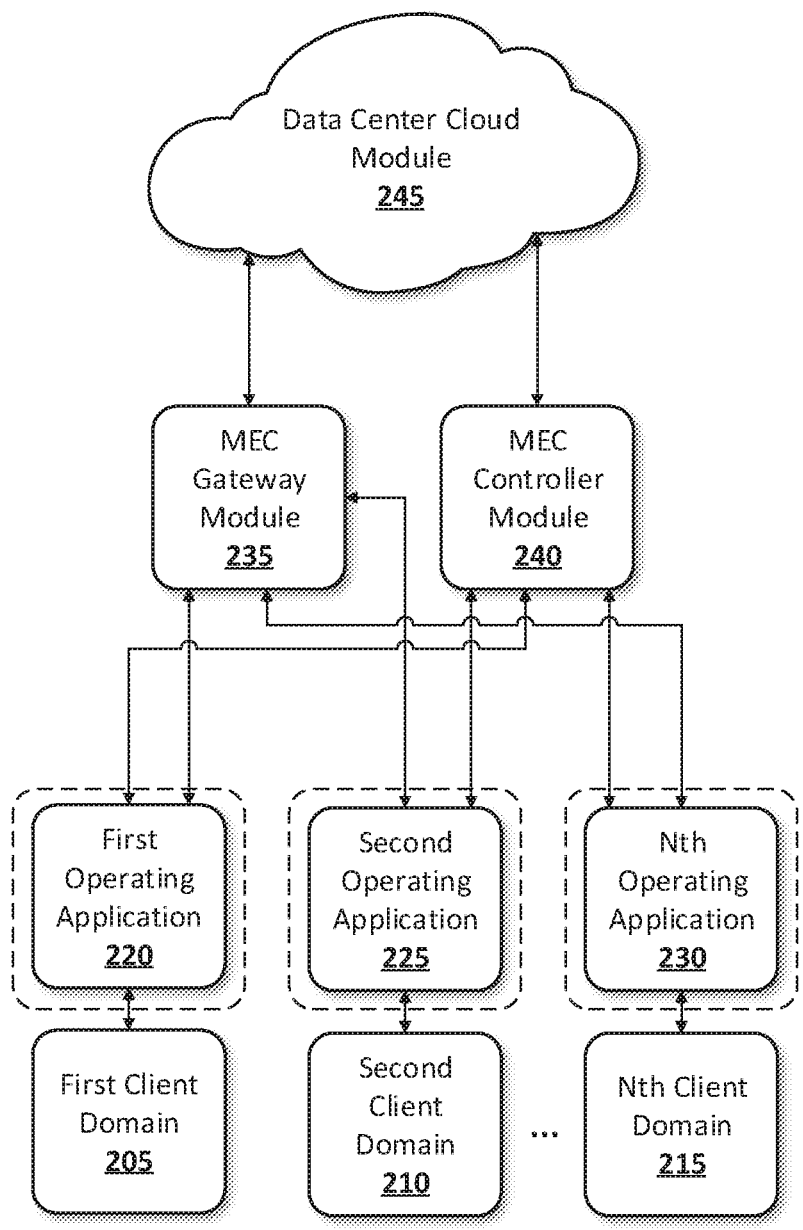
FIG. 2, illustrates an exemplary software module diagram of a communication system, in accordance with an embodiment of the present invention.

FIG. 1 illustrates an exemplary communication system architecture 100, in accordance with an embodiment of the present invention. In the present embodiment, the communication system architecture may include a multiplicity of remote clients with a sampling denoted as first remote clients 104 and second remote clients 108, wherein the first remote clients and the second remote clients may be robots or substantially any other computing device that may receive executable computer-readable instructions over a network to actuate the device to perform automated functions. In the present embodiment, the communication system may further include a multiplicity of client domains which may include the first remote clients and the second remote clients, wherein a sampling of the client domains may be denoted as a first client domain 112 and a second client domain 116. Furthermore, the first and second client domains may be configured to be a robo domains, wherein the robo domains may include, for example, and without limitation, a multiplicity of robots. In some alternative embodiments the multiplicity of client domains may be domains including, for example, and without limitation, a multiplicity of substantially any other types of computing devices that may receive executable computer-readable instructions over a network to actuate automated functions of the device to perform particular tasks, wherein domains may be identified by the type of device that may be included within the domains. In the present embodiment the communication system may further include a multiplicity of MEC servers; a sampling of MEC servers may be denoted as a first MEC server 120 and a second MEC server 124, wherein the first MEC server may include one or more first operation application databases 128, and the second MEC server may include one or more second operation application databases 132. In many embodiments, the one or more first and second operation application databases may include one or more operating applications further comprising operational application information related to operational functions of the multiplicity of clients, wherein the operational application information may include for example, and without limitation, client connection data, client status data, downloadable client operation data, client computing data, and executable computer-readable instructions that may be downloaded and executed by processors of the clients, which may cause the clients to perform tasks and operations related to, for example, and without limitation, defense, agriculture, manufacturing, flight, construction, maintenance, ground movement, aquatic movement, signal processing, data collection, data transmission, or any combination thereof which may be assigned to the clients in order for the clients to possibly perform particular respective tasks related to the one or more operating applications. In the present embodiment, the one or more first and second operation application databases that may include one or more operating applications may be robo application databases, wherein the robo application databases may include one or more robo applications. The robo applications may further include robot operation application information, wherein connection data, status data, downloadable operation data, computing data, and executable computer-readable instructions that may be downloaded to and executed by robots and thus may govern the robots to perform particular respective tasks. In some alternative embodiments the databases, applications, and application information may be related to, for example, and without limitation, substantially any other computing device that may receive executable computer-readable instructions over a network to actuate automated functions of the device to perform particular tasks, wherein databases, applications and application information may be represented by a type of device that may be controlled. In the present embodiment, the communication system may further include a multiplicity of cellular networks, wherein a sampling of the multiplicity of cellular networks may be denoted as a first cellular network 136 and a second cellular network 138. In many embodiments of the present invention, the multiplicity of client domains which may include the multiplicity of remote clients may be operably coupled to the multiplicity of MEC servers via the multiplicity of cellular networks. Furthermore, in the present embodiment, first MEC server 120 may be configured to be in a close communicational proximity to first cellular network 136 and second MEC server 124 may be in a close communicational proximity to second cellular network 138. In many embodiments of the present invention, the communication system may further include a MEC controller 140, wherein each of the multiplicity of MEC servers may be operably coupled to the MEC controller via a multiplicity of server-controller communication channels. In the present embodiment, a sampling of the multiplicity of server-controller communication channels may be denoted as a first server-controller communication channel 144 and a second server-controller channel 148, wherein the first MEC sever may be operably coupled to the MEC controller via first server-controller communication channel 144, moreover, the second MEC server may be operably coupled to the MEC controller via second server-controller communication channel 148. In many embodiments, the multiplicity of server-controller communication channels may include IP/MPLS networks, wireless networks, wired networks, internet, intranet, local area networks (LANs), wide area networks (WANs), wired telephone networks, substantially any other network supporting data communication between respective entities, or any combination thereof. In the present embodiment, MEC controller 140 may further include an operating application controller master database 198, wherein the operating application controller master database may store a table comprising indexed client registration information and communication system data which may be used maintain an optimal load balance. In many embodiments of the present invention, the communication system may further include a MEC gateway 162, wherein the MEC gateway may be operably coupled to the multiplicity of MEC servers via a multiplicity of server-gateway communication channels. In the present embodiment, a sampling of the multiplicity of server-gateway communication channels may be denoted as a first server-gateway communication channel 152 and a second server-gateway communication channel 156, wherein the first MEC server may be operably couple to the MEC gateway via the first sever-gateway communication channel, moreover, the second MEC server may be operably coupled to the MEC gateway via the second server-gateway communication channel. In many embodiments of the present invention, the multiplicity of server-gateway communication channels may include IP/MPLS, wireless networks, wired networks, internet, intranet, local area networks (LANs), wide area networks (WANs), wired telephone networks, substantially any other network supporting data communication between respective entities, or any combination thereof. In some embodiments, each MEC Server may establish bi-directional secure session with the MEC Gateway. The security may be based on, but not limited to, the standard IPSec security. In the present embodiment, the communication system may further include internet 160, communication overlay/tunneling 164, Egress Edge PE router 168, and a data center cloud 172 wherein, the MEC gateway may be operably coupled with the data center cloud via the internet, communication overlay/tunneling 164, and Egress Edge PE router 168. The communication overlay/tunneling 164 may, without limitation, be over MPLSoGRE, VXLAN or IP/MPLS network. Egress Edge PE router 168 may act as a Data Center Interconnect (DCI) device and may have overlay/tunneling connection to a data center primary 176 and backup 180 servers. These Servers may have multiple Virtual Machines (VM)s running and each of the VMs may be viewed as maintaining one to one replication with the MEC Server Robo Application. First MEC Server 120, first operation application databases 128 may be deployed or brought up in one of the VMs in both primary 176 and backup 180 servers and the second MEC Server 124, second operation application databases 132 may be deployed or brought up in another VM in both primary 176 and backup 180 servers. As the MEC Server Robo Application DB gets updated through the registration mechanism with the MEC Controller and through Robo Joining/Leaving these Robo Application data/state information may also be updated as well in the primary 176 and backup 180 servers VMs. This way MEC Server Robo Application Data Base & application state transition is stored as well in the corresponding VM in the Data Center's Primary and Backup Server. In some embodiments, the MEC Servers may be configured as to how frequently they may be updating the Robo Application shadow state information in the DC Cloud VM. The MEC Servers may also be configured with the corresponding VM IP addresses so each MEC Server knows which VM it maps into in the DC Cloud for maintaining its shadow information. Furthermore, data center cloud 172 may include a multiplicity of cloud data center servers/databases; a sampling of the multiplicity of cloud data center servers/databases may be denoted as a first cloud data center server/database, e.g., primary 176 server, and a second cloud data center server/database, e.g., backup 180 server. In many embodiments of the present invention, the multiplicity of cloud data center servers/databases may include one or more shadow operating applications, wherein the shadow operating applications may store duplicate operational application information related to the operational functions of the multiplicity of clients, and thus may track a data progression and system changes as the multiplicity of client change operation statuses and progress through tasks. In the present embodiment, the one or more shadow operating applications may be shadow robo applications which may further include duplicate robot operation application information and thus may track a data progression and system changes as the multiplicity of robots change operation statuses and progress through tasks. In some alternative embodiments, the one or more shadow operating applications may be shadow device operating applications of substantially any other computing device that may receive executable computer-readable instructions over a network to actuate automated functions of the device to perform particular tasks, wherein the shadow device operating applications may further include duplicate device operation application information and thus may track a data progression and system changes as a multiplicity of devices change operation statuses and progress through tasks. In the present embodiment, the communication system may further include a multiplicity of edge PE-data center communication channels, wherein a sampling of the multiplicity of edge PE-data center communication channels may be denoted as a first edge PE-data center communication channel 184 and a second edge PE-data center communication channel 188. In many embodiments of the present invention, the multiplicity of edge PE-data center communication channels may include IP/MPLS, wired networks, internet, intranet, local area networks (LANs), wide area networks (WANs), wired telephone networks, overlay/tunneling, substantially any other network supporting data communication between respective entities, or any combination thereof. Furthermore, in the present embodiment, first cloud data center server/database 176 may be operably coupled with the MEC gateway via the first edge PE-data center communication channel, internet 160, communication overlay/tunneling 164, and Edge PE 168, and similarly the second cloud data center server/database 180 may be operably coupled to the MEC gateway via the second edge PE-data center communication channel, internet 160, communication overlay/tunneling 164, and Edge PE 168. In the present embodiment, data center cloud 172 may further comprise a provider platform 192, wherein the provider platform may further store client operation data and server operation data. In the present embodiment the client operation data may include robot operation data. Moreover, in alternative embodiments, client operation data may be device operation data, wherein the device operation data may be operation data of substantially any other computing device that may receive executable computer-readable instructions over a network to actuate automated functions of the device to perform particular tasks. In the present embodiment the provider platform may be operably coupled to the multiplicity of cloud data center server/databases via cloud communication channels. Furthermore, the provider platform may also be operably couple to the MEC controller via a controller-provider communication channel 196. In many embodiments of the present invention, the controller-provider communication channels may include IP/MPLS, wireless networks, wired networks, internet, intranet, local area networks (LANs), wide area networks (WANs), wired telephone networks, substantially any other network supporting data communication between respective entities, or any combination thereof FIG. 2, illustrates an exemplary software module diagram 200 of a communication system, in accordance with an embodiment of the present invention. In the present embodiment, the communication system may include a multiplicity of remote clients sampled as a first remote client domain 205, a second remote client domain 210, and an $n^{th}$ remote client domain 215, wherein n may be substantially any positive integer. The communication system may further include a multiplicity of MEC servers sampled as a first MEC servers, a second MEC server, and an $n^{th}$ MEC server (where n may be substantially any positive integer), wherein each MEC server may be respectively, operably coupled to, and in two-way communication with, each remote client domain, and each MEC server may execute a respective multiplicity of operating applications sampled as a first operating application 220, a second operating application 225, and an $n^{th}$ operating application 230 (where n may be substantially any positive integer). In the present embodiment, each MEC server may be in communication with each client domain respectively, over a cellular network. Furthermore, in the present embodiment, the communication system may further include a MEC gateway module 235, a MEC controller module 240 and a data center cloud module 245, wherein the MEC gateway module and the MEC controller module may be operably coupled and in two-way communication with the data center cloud module via a network such as, and without limitation, the internet and/or IP/MPLS. The communication system may also include each operating application of each MEC sever operably coupled to and in two-way communication with both the MEC gateway and the MEC controller. In many embodiments each client domain may include a grouping of one or more clients, wherein the clients may be group by location and furthermore the clients may include, without limitation, robots, automated computing devices, GUI enabled general purpose computers, sensors, vehicles configured with automated processes such as, and without limitation, automated airplanes, automated motor vehicles, automated trains, automated aquatic vehicles, automated helicopter or other flying vehicles, an automated drone, or other general connected devices with on-board memory and processors to download the application for the connected devices and to process the actions, or substantially any other device or combination thereof which may be network enabled for communication and configurable to execute computer-readable instructions received over the network. In some embodiments, mobile clients moving from one location to another may have to leave one domain (MEC server) based on their location and then do an auto discovery and registration with a new MEC server. In a non-limiting example, initially these moving clients may join some domain or MEC server and once the device application data is downloaded on their on-board memory, they may take localized actions. Once they start moving and after certain radius they leave their current domain/MEC server then they may not need to auto-discover the new domain/MEC server until they reach another city or location. They may decide to join another domain/MEC server based on their need or when they reach a certain location. Furthermore, in many embodiments, each MEC server may execute a respective operating application and thus may transmit operation information to a respective client domain, wherein individual clients of the client domain may begin to operate to perform particular tasks. Furthermore, the clients may transmit operation data back to the respectively coupled MEC servers, wherein the operating applications of each MEC server may then transmit the operation data to the MEC gateway module and/or the MEC controller module. In some embodiments the MEC gateway module may forward the operation data from one or more particular MEC servers to a different one or more particular MEC server so that data gathered by one or more client domains may be communicated to and possibly used for altering an operation of a different one or more client domains. In some embodiments, the MEC gateway module may forward operation data to the data center cloud module wherein, the data may be stored in servers and used to maintain a shadow record of substantially all operations of the communications system. In many embodiments, each operating application of each MEC server may also forward operation data to the MEC controller module, wherein the MEC controller module may maintain a running record of data from each client domain and each MEC server. The record may be used to dictate which operating applications may be applied to which clients. The record may also be forwarded to the data center cloud module to further supply the shadow record with information. Further communication abilities of the many embodiments of the communication system may become apparent as described below.

In many embodiments of the present invention, and with reference to FIG. 1 and FIG. 2, the communication system may provide, for example, and without limitation, client to client communication, which will be described below by way of exemplary, and without limitation, reference to robots. In the present embodiment, the communication system may include a multiplicity of remote robot clients, wherein the multiplicity of remote robot clients may be organized into a multiplicity of robo domains based on a location of the robots and particular tasks that may be performed by the robots. By way of example, and without limitation, a first robo domain may include a first grouping of one or more robots and a second robo domain may include a second grouping of different one or more robots. Those skilled in the art, in light of and in accordance with the teaching of the present invention would readily recognize that the communication system may include substantially any number of domains, wherein each domain may include a multiplicity of robots. In the present embodiment, the communication system may also include a multiplicity of MEC servers, wherein each MEC server may host one or more robo applications and each robo domain may be a subset of a particular robo application. By way of example, and without limitation, first MEC server 120 may be operably coupled to the first robo domain, wherein the first robo domain may be a subset of a first robo application, and the first robo application may be stored in the first MEC server. Moreover, second MEC server 124 may be operably coupled to the second robo domain, wherein the second robo domain may be a subset of a second robo application, and the second robo application may be stored in the second MEC server. Those skilled in the art, in light of and in accordance with the teaching of the present invention would readily recognize that the communication system may include substantially any number of MEC servers, wherein each MEC server may be operably coupled to a different domain and each domain may be a subset of a different stored application, stored in the MEC servers respectively. Furthermore, each MEC server may communicate robo application data to the robots of the robo domain that each MEC server may be operably coupled to. In the present embodiment, the robo domains may be configured to receive clusters of services from the particular robo application from which they may be a subset of. In the present embodiment, the first grouping of one or more robot clients may be configured to include a communicational connection with the first MEC server so that intra-communication within the first grouping of robots may occur within the first robo domain. Furthermore, the second grouping of one or more robot clients may be configured to include a communicational connection with the second MEC server so that intra communication within the second grouping of robot may occur within the second robo domain. In the present embodiment, each MEC server may also connect to MEC controller 140 which may continuously record communication system data, wherein the data may be used to potentially maintain an overall monitoring and tracking of substantially all MEC servers and robo domain operations. Furthermore, the MEC servers may be bound, via instruction from the MEC controller, to maintain a predetermined number of the communicational connections, wherein the predetermined number may be managed by the MEC controller to achieve an optimal performance. In the present embodiment, the communication system may be configured to potentially prevent robots within a particular domain from forming a communicational connection with a MEC server that may have already reached the predetermined number communicational connections to other robot However, in the present embodiment, the communication system may also be configured to include MEC gateway 148, wherein each MEC server may be operably connected to the MEC gateway. Furthermore, inter-communication between robots of different domains may be achieved by communication possibly being directed through the MEC gateway. In the present embodiment, the MEC servers of the communication system may also be configured to transmit the robo application to data center cloud 172 over an IP/MPLS network to maintain shadow robo applications in the cloud. Furthermore, the MEC controller may also transmit communication system data to the data center cloud via a data center provider platform.

In many embodiments of the present invention, and with reference to FIG. 1 and FIG. 2, the communication system may also provide, for example, and without limitation, inter-connected client domains, which will be described below by way of exemplary, and without limitation, reference to robots. In the present embodiment, first MEC server 120 may be configured to execute the first robo application with respect to the first robo domain, moreover the second MEC server 124 may be configured to execute the second robo application with respect to the second robo domain. Furthermore, by way of example, and without limitation, the first MEC server may be further configured to create a first unique domain ID that may identify the first robo domain, moreover the second MEC server may be further configured to create a second unique domain ID that may identify the second robo domain, wherein the first unique domain ID and the second unique domain ID may be different. Those skilled in the art, in light of and in accordance with the teaching of the present invention may readily recognize that the communication system may include substantially any number of MEC servers, wherein each particular MEC server may create a unique domain ID to identify a domain which the particular MEC server may be operably coupled to, furthermore each created unique domain ID may be different from other possible created unique domain IDs that may be in use. Moreover, each unique domain ID may be registered in a domain ID database in MEC gateway 148 after creation, if a same unique domain ID is not already registered, wherein each unique domain ID may be utilized to categorize and index the communication system data. In the present embodiment, each MEC server may be configured to gather data from the robots of robo domains that each MEC server may be operably coupled to, furthermore the gathered data and unique domain IDs may be transmitted to the MEC gateway, wherein the MEC gateway may be configured to store each unique domain ID, the gathered data, and communication system data from the monitoring and tracking of substantially all MEC servers and robo domain operations. In the present embodiment the MEC gateway may further be configure to perform a domain ID database lookup, and may forward communication system data related to a particular robo domain to another robo domain via a MEC server that may be operably coupled to the other robo domain. By way of illustrative example, and without limitation, the communication system may include a multiplicity of deployed agricultural robots organized into three agricultural robo domains, wherein each agricultural robo domain may be in communication with a respective MEC server based on robot locations. Furthermore, by way of illustrative example, and without limitation, the robot locations may be in a first city, a second city and a third city, wherein one of the three agricultural robo domains and its respective MEC server may be deployed in each city. Moreover, each respective MEC server may also be in communication with a same MEC gateway. By further way of illustrative example, and without limitation, A MEC server in the first city may receive weather data from an agricultural robo domain deployed in the first city, wherein the MEC server in the first city may then forward the weather information to the MEC gateway and the MEC gateway may then possibly decide to forward the weather data to one or both of the other MEC servers deployed in the second and third cities respectively. Based on the possibly forwarded weather data, the robots of the agricultural robo domains in the second and/or third city respectively, may alter operation.

Figure 3:
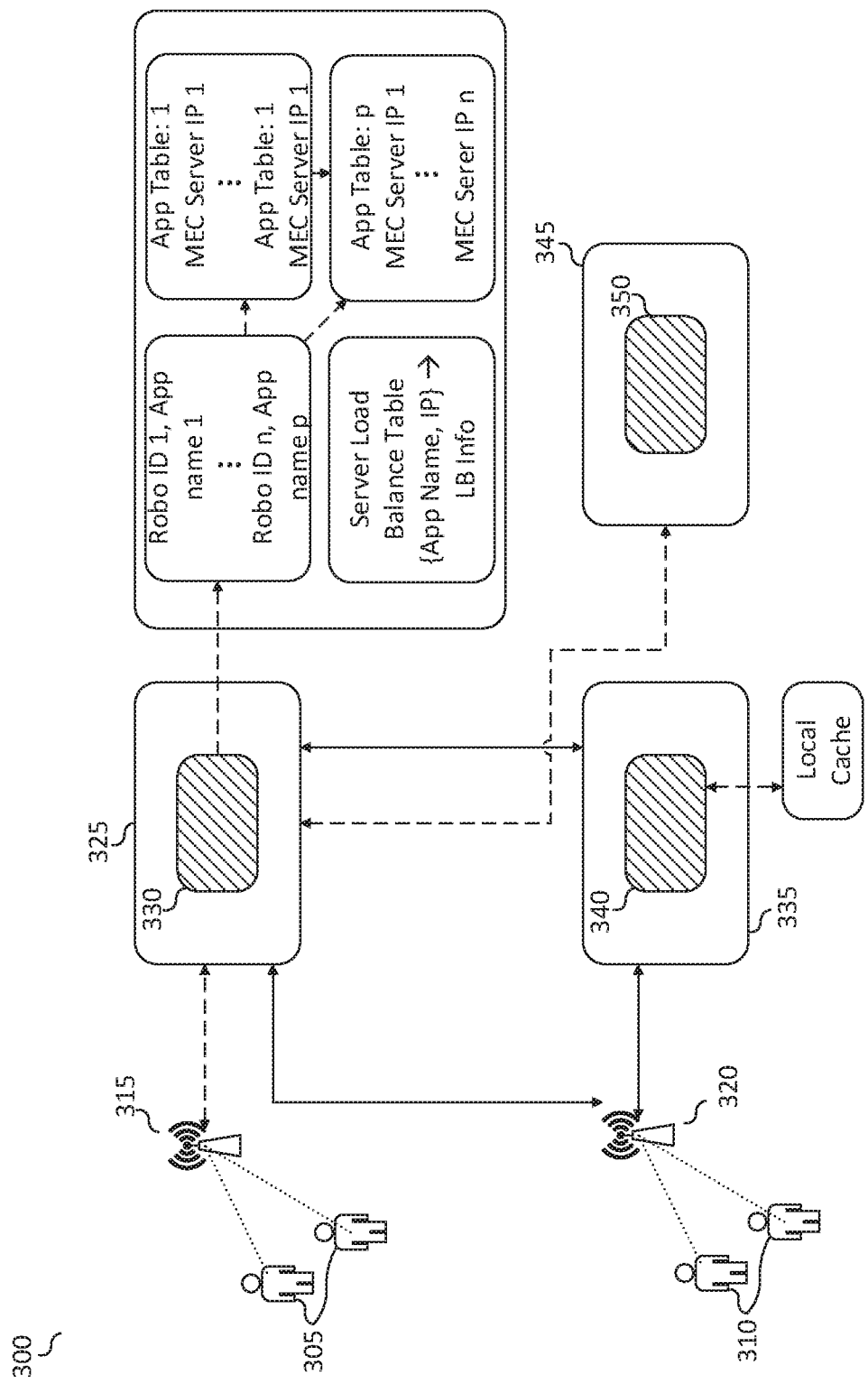
FIG. 3 illustrates another exemplary communication system architecture, in accordance with an embodiment of the present invention.

FIG. 3 illustrates another exemplary communication system architecture 300, in accordance with an embodiment of the present invention. In many embodiments of the present invention, and with reference to FIG. 1 and FIG. 2 the communication system may also provide, for example, and without limitation, client operating application auto discovery and registration, which will be described below by way of exemplary, and without limitation, reference to robots. In some embodiments of the present invention the communication system may include for example, and without limitation, a multiplicity of robots, wherein a sampling may be denoted as a first grouping 305 and a second grouping 310. The communication system may further include a first cellular network 315, a second cellular network 320, a MEC controller 325, an operating application controller master database 330, a first MEC server 335, a first operation application database 340, a second MEC server 345, and a second operation application server 350, wherein the operating application controller master data base may store communication system data organized in a multiplicity of tables. Furthermore, the multiplicity of tables may include, and without limitation, operating application tables, device registration tables, and server load balance tables. In the present embodiment each of the first operating database and the second operating database may host respective operating applications, wherein the operating applications may be robo applications. Furthermore, one or both of the MEC servers may be configured to register with the MEC controller, wherein one or both of the MEC severs may send a register request signal to the MEC controller. The register request signal may include an IP of the registration requesting MEC server, a unique domain ID, individual robot IDs, and an operating application name of the operating application which the MEC server stores. The MEC controller may be configured to receive the signal and begin building an operating application table, wherein the MEC server IP may be added to a particular operating application table for which it belongs. In the present embodiment, the MEC controller may also be configured to send a registration reply to registration requesting MEC servers, after registration is completed. The operating application controller master database of the MEC controller may be configured to be populated with unique domain IDs, individual robot IDs, operating application names, and MEC server IPs, wherein a portion of the operating application names may be the unique domain IDs. Furthermore, the MEC controller may store the individual robo IDs with the operating application names in device registration tables, wherein the controller may map device registration tables to operating application tables as illustrated in FIG. 3. In the present embodiment, the MEC controller may also be configured to receive robo connection update notification data from the MEC server as the robots may join and/or leave a particular MEC server, wherein for each MEC server, the operating application master data base of the MEC controller, may store and thus track the notification data in the server load balance table. The notification data may include MEC server IDs and operational application names. Furthermore, data of the server load balance tables may be used to possibly ensure that each MEC server may not exceed a predetermined number of robot communicational connections. This may allow a processing load to be shared across the MEC servers. Those skilled in the relevant art, in light of and in accordance with the teachings of the present invention may readily recognize the communication system may include substantially any number of MEC servers wherein the MEC controller may record the above described data for each of the any number of MEC servers, furthermore the described robots may be substantially any clients such as, and without limitation, any other types of computing devices that may receive executable computer-readable instructions over a network to actuate automated functions of the device to perform particular tasks, wherein domains, devices, applications and connection may be identified by the type of device that may be included within the domains.

In many embodiments of the present invention, individual robots, which may belong to particular domains based on operating applications, may send discovery requests signals to the MEC controller after the individual robots may be powered on, wherein the discovery request signals may include unique robo IDs. Furthermore, based on the unique robo IDs, the MEC controller may be configured to find an appropriate MEC server to which a particular individual robot, comprising a particular unique robo ID, may be assigned to and thus may form a communicational connection with, wherein an appropriate MEC server may be a MEC server in communication with a same cellular network as the particular individual robot and the MEC server may also not be exceeding a predetermined number of communicational connections with other individual robots. In the present embodiment the MEC controller may also be configured to send discovery reply signals to discovery requesting robots in response to the discovery request, wherein the discovery reply signals may include MEC server IPs and operating application names. In many embodiments of the present invention, and with reference to FIG. 3 the communication system may also provide, for example, and without limitation, client to MEC server peripheral communication wherein the peripheral communication may include the transmission of joining data, download data, and leave data, which will be described below by way of exemplary, and without limitation, reference to robots. In the present embodiment, individual robots may begin to communicate with assigned MEC servers after the individual robots may receive the discovery reply from the MEC controller, wherein beginning communication may include the individual robots transmitting join request signals to the assigned MEC servers. Furthermore, the MEC servers may be configured to receive the join request signals, accept the join requests, and update a local cache with robo IDs from joining robots and also update a total number of accepted join request, wherein the total number of accepted join request may correspond to different accepted robots that may be in communicational connection with a particular MEC server. In many embodiments, the MEC servers may also be configured to transmit a join reply signal to assigned join requesting robots, after a successful joining, wherein the robots may be configured to receive the join reply signal. The MEC server may also be configured to transmit connection update notifications to the MEC controller in response to transmitting the join reply signal to a robot. In some embodiments, robots may be configured to repeat a discovery process with the MEC controller in order to change a MEC server assignment in a case that no join reply signal may be received from a current assigned MEC server. In the present embodiment, also after a successful joining, each assigned and now joined MEC server may transmit a data download start notification signal to a respective successfully joined and assigned robot. In a case that a robot may be ready for a data download, the robot may be configured to transmit a data download accept notification to the respectively assigned MEC server, wherein each MEC server may then start a data download to the robot that transmitted the data download accept notification. In some embodiments, in a case that no data download accept notification may be received from the successfully joined assigned robot, each MEC server may be configured to continuously transmit a data download start notification to successfully joined assigned robots respectively, wherein the continuous transmission may continue for a particular MEC server until a data download accept notification may be received from an assigned and successfully joined robot. When the data download may be complete, a finished downloading MEC server, may transmit a data download end notification to the assigned robot, wherein the robot may then operate according to instructions that may have been downloaded. In some embodiments, operating robots may decide to go offline, in a case that an operating robot chooses to go offline, the operating robot may first transmit a leave request signal to the assigned MEC server, wherein the assign MEC Server may respond to the operating robot by transmitting a leave reply. After transmitting the leave reply to operating robot, the assigned MEC server may transmit a connection update notification to the MEC controller. Those skilled in the relevant art, in light of and in accordance with the teachings of the present invention may readily recognize the described robots may be substantially any clients such as, and without limitation, any other types of computing devices that may receive executable computer-readable instructions over a network to actuate automated functions of the device to perform particular tasks.

In many embodiments of the present invention, and with reference to FIG. 3, the communication system may also provide, for example, and without limitation, a load balancing between the MEC servers, wherein the MEC controller may have an overall view of substantially all MEC servers that may be operably coupled to the MEC controller in order to maintain a load balancing, which will be described below by way of exemplary, and without limitation, reference to robots. In the present embodiment, as each MEC server may receive and may accept join and leave signals, each MEC server may transmit connection update notifications to the MEC controller. Furthermore, the MEC controller may be further configured to build up the server load balance table in the operating application controller master database based on connection update notification information. In the server load balance table each MEC server IP and respective server operating application name may be stored, maintained and associated with load balance information, wherein load balance information may include a number of active robot connections each MEC server may have, information about the connections, and other load balance information. An exemplary, without limitation, load balance entry may be illustrated as "{MEC Server IP, Application Name}→{Active Robo Connections Info and/or Load Balance Info}". Other load balance information may include a predetermined number of maximum active communicational connections per MEC server. In the present embodiment, the MEC controller may use information from entries of the server load balance table to possibly ensure that each MEC server may maintain a certain numbers of active communicational connections to different robots, wherein the certain number may not exceed the predetermined number of maximum active communicational connections for a particular MEC server. In the present embodiment, when an individual robot may perform a discovery process with the MEC Controller using a unique robo ID, the MEC controller may perform a table look-up, using the unique robo ID to possibly locate which operating application the robot should possibly be registered for. The MEC controller may also possibly locate an appropriate MEC server that the robot should possibly be assigned to, wherein the appropriate MEC server may already be registered with the MEC Controller, for an operating application that the robot should possibly be register for. Once the appropriate MEC server may be chosen for a particular robot and operating application, the MEC controller may compare a number of active communicational connections between other robots that the appropriate MEC sever may currently have to the predetermined number of maximum active communicational connections to possibly ensure that an addition of the particular robot may not exceed the predetermined number of maximum active communicational connections for the appropriate MEC server. In a case that the appropriate MEC server may not currently be able to form any more active communicational connections to robots, the MEC controller may locate a different MEC server, using information from the server load balance table and may attempt the comparison again to possibly ensure that the different MEC server may be able to accept new communicational connections. Those skilled in the relevant art, in light of and in accordance with the teachings of the present invention may readily recognize that the described robots may be substantially any clients such as, and without limitation, any other types of computing devices that may receive executable computer-readable instructions over a network to actuate automated functions of the device to perform particular tasks.

Figure 4:
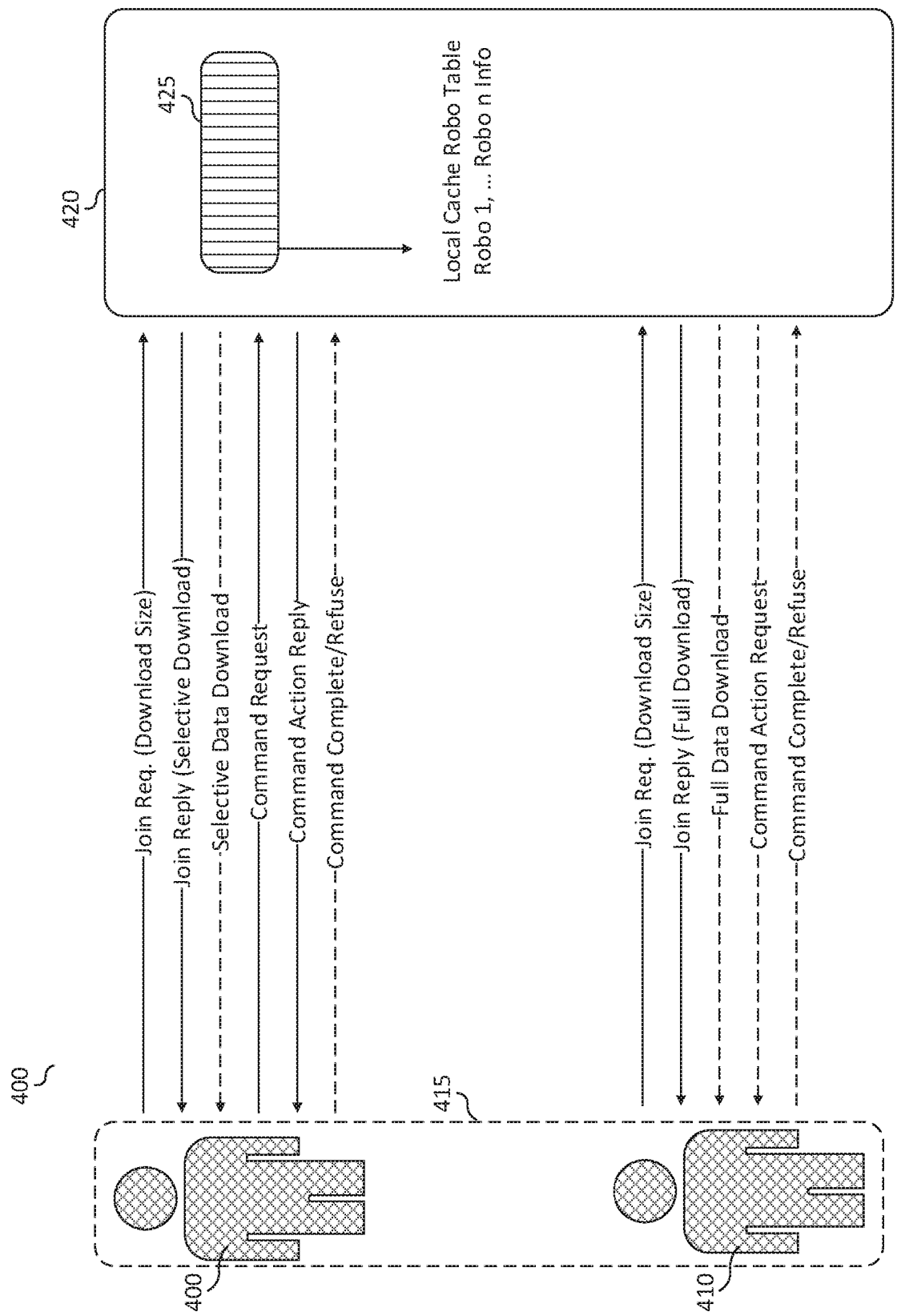
FIG. 4 illustrates another exemplary communication system architecture, in accordance with an embodiment of the present invention.

FIG. 4 illustrates another exemplary communication system architecture 400, in accordance with an embodiment of the present invention. In many embodiments of the present invention, the communication system may provide, for example, and without limitation, selective and/or full download of operating application data from the MEC servers to clients, which will be described below by way of exemplary, and without limitation, reference to robots. In some embodiments of the present invention the communication system may include for example, and without limitation, a first robot 405 and a second robot 410, wherein the first robot and the second robot may belong to a same domain and each robot may include an on-board cache to store databases for performing tasks. In some embodiments, a cache size of the robots may be different sizes. In the present embodiment the communication system may further include a heterogeneous domain 415, wherein the heterogeneous domain may include robots with differing cache sizes. Furthermore, in the present embodiment, a joining robot may be configured to transmit a cache size of the joining robot along with a join request when the joining robot may request to join a particular MEC server 420. The particular MEC server 420 may be configured to decide how much operating application database to download to the joining robot, based on the cache size received along with the join request. In some embodiments of the present invention, a cache size of the robots may be limited, wherein a limited cache size may not allow a full download of an operating application database. In some other embodiments of the present invention a cache size of the robots may be ample, wherein an ample cache size may allow a full download of an operating application database. In the present embodiment, the particular MEC server 420 may be configured to possibly determine if the cache size of the joining robot may be limited or may be ample. In a case that the particular MEC server 420 may determine that the cache size of the joining robot may be limited, the particular MEC server 420 may also be configured to perform a partial operating application database download to the joining robot. Furthermore, in a case that the particular MEC server 420 may determine that the cache size of the joining robot may be ample, the particular MEC server 420 may also be configured to perform a full operating application database download to the joining robot. In many embodiments of the present invention, the communication system may include a multiplicity of MEC servers in communicational connection with a multiplicity of robots, wherein each robot may be configured to transmit a cache size as described above and each MEC server may be configured to determine robot cache size and further perform a full download or partial download as also described above to each assigned robot. Furthermore, in many alternative embodiments, the described robots may be substantially any clients such as, and without limitation, any other types of computing devices that may receive executable computer-readable instructions over a network to actuate automated functions of the device to perform particular tasks. In another alternative embodiment, a join request may also include database identifiers, wherein the database identifiers may identify portions of information that may be currently stored in a robot and or client device. Furthermore, an assigned MEC server may be configured to receive the join request and choose particular portions of an operating application database to download, in response to the database identifiers.

In many embodiments of the present invention, the communication system may include both heterogeneous domains and homogeneous domains, wherein a homogeneous domain may include clients with a same cache size and a heterogeneous domain main may include clients with differing cache sizes. Furthermore, in many embodiments of the present invention, MEC servers may be configured to control the domains and govern substantially all client actions that may be actuated throughout the domains such that the MEC servers may control the domain to possibly achieve a fluid functioning.

Figure 5:
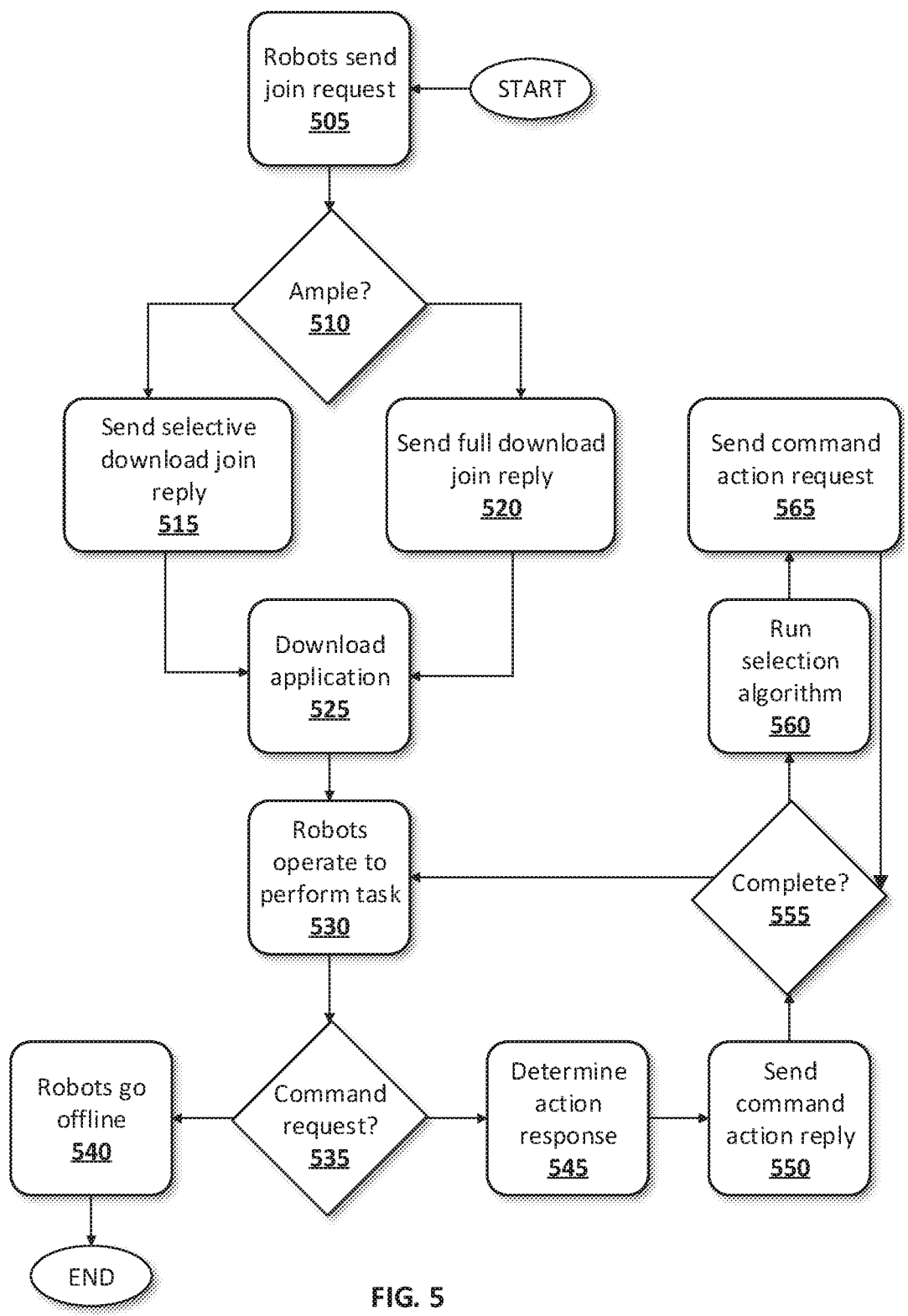
FIG. 5 illustrates a flowchart of an exemplary method of using a communication system in accordance with an embodiment of the present invention.

FIG. 5 illustrates a flowchart of an exemplary method 500 of using a communication system in accordance with an embodiment of the present invention. In the present embodiment, with reference to FIG. 4, by way of example, and without limitation, the communication system may be used to control clients in an exemplary, without limitation, heterogeneous domain, wherein the clients may be for example, and without limitation, robots. As illustrated in FIG. 4, by way of example, and without limitation, MEC server 420 may be configured to be in control of heterogeneous domain 415, wherein the heterogeneous domain may further be configured as a robo domain. The heterogeneous domain may include first robot 405 and second robot 410, wherein both robots may have already been discovered and also may have already been assigned to MEC server 420. Furthermore, by way of example, and without limitation the first robot may include a limited on-board cache, and the second robot may include an ample on-board cache. In a step 505, both robots may transmit a join request to MEC server 420, wherein the join request from the first robot may include a download size indicative of the limited on-board cache of the first robot, and the join request from the second robot may include a download size indicative of the ample on-board cache of the second robot. Next, in a decision step 510, the MEC server may decide do a full or partial download for each of the robots, based on the download size from each robot respectively, wherein the decision may include checking for an ample download size. In a case that a download size from a robot may not be ample, the MEC server may send a selective download join reply to the robot with non-ample download size, in a step 515, wherein the selective download join reply may also notify the robot with non-ample download size that a partial download may occur. In a case that a download size from a robot may be ample, the MEC server may send a full download join reply to the robot with ample download size, in a step 520, wherein the full download join reply may also notify the robot with ample download size that a full download may occur. Next, in a step 525, the MEC server may downloading operating database data accordingly to both robots. In a step 530 each robot may begin to perform particular tasks. The MEC server may be in constant communication with the robots of the domain, in a decision step 535 the MEC server may wait for a command request from any of the robots of the domain. In a case that a command request may not be received by the MEC server before each robot in the domain complete all tasks, the robots may go offline in a step 540. However, in some practical application embodiments, a robot may become partially incapacitated and thus may not have an ability to complete a task due to, for example, and without limitation, low cache space, insufficient database information, insufficient processing power, etc. In this case, the partially incapacitated robot may transmit a command request to the MEC server, wherein the MEC server may receive the command request and using a master database 425 for the domain, the MEC server may perform processing to determine an action response to the command request in a step 545. Next, in a step 550, the MEC server may transmit a command action reply to the partially incapacitated robot, wherein the command action reply may include instructions and/or actuation signals for the partially incapacitated robot to possibly actuate the determined action response and thus possibly complete the task. In the present embodiment the partially incapacitated robot may not cache this command/action since the partially incapacitated robot may have limited cache space. In a decision step 555, the MEC server may wait for a completion command from the partially incapacitated robot. In a case that the partially incapacitated robot may be able to complete the task, the partially incapacitated robot may transmit a command complete signal to the MEC server, wherein the MEC server may receive the command complete signal and the robots may continue to operate to perform particular task and thus the method of the present embodiment may cycle back to step 530. In a case that the partially incapacitated robot may not be able to complete the task, the partially incapacitated robot may transmit a command refuse signal to the MEC server or the partially incapacitated robot may not transmit a signal at all, wherein the MEC server may receive the command refuse signal or allow a predetermine amount of time to elapse before trying to choose another robot from the same domain to complete the task. In a step 560, the MEC Server may run an algorithm to select a robot from the domain to possibly complete the task. Once another robot may be selected, the MEC server may transmit a command action request to the selected robot in a step 565, wherein the selected robot may have a full operational application database, and thus may be able to perform a database look-up based on the command action request and may perform a command action of the command action request. After transmitting the command action request, the MEC server may cycle back to decision step 555 and wait for a completion response. The MEC server may exhaustively attempt to ensure that any command action for that domain may be performed successfully. Therefore, until all command actions may be performed successfully the MEC Server may continue to choose substantially any robot from the domain that may possibly be able to complete the command action successfully.

Figure 6:
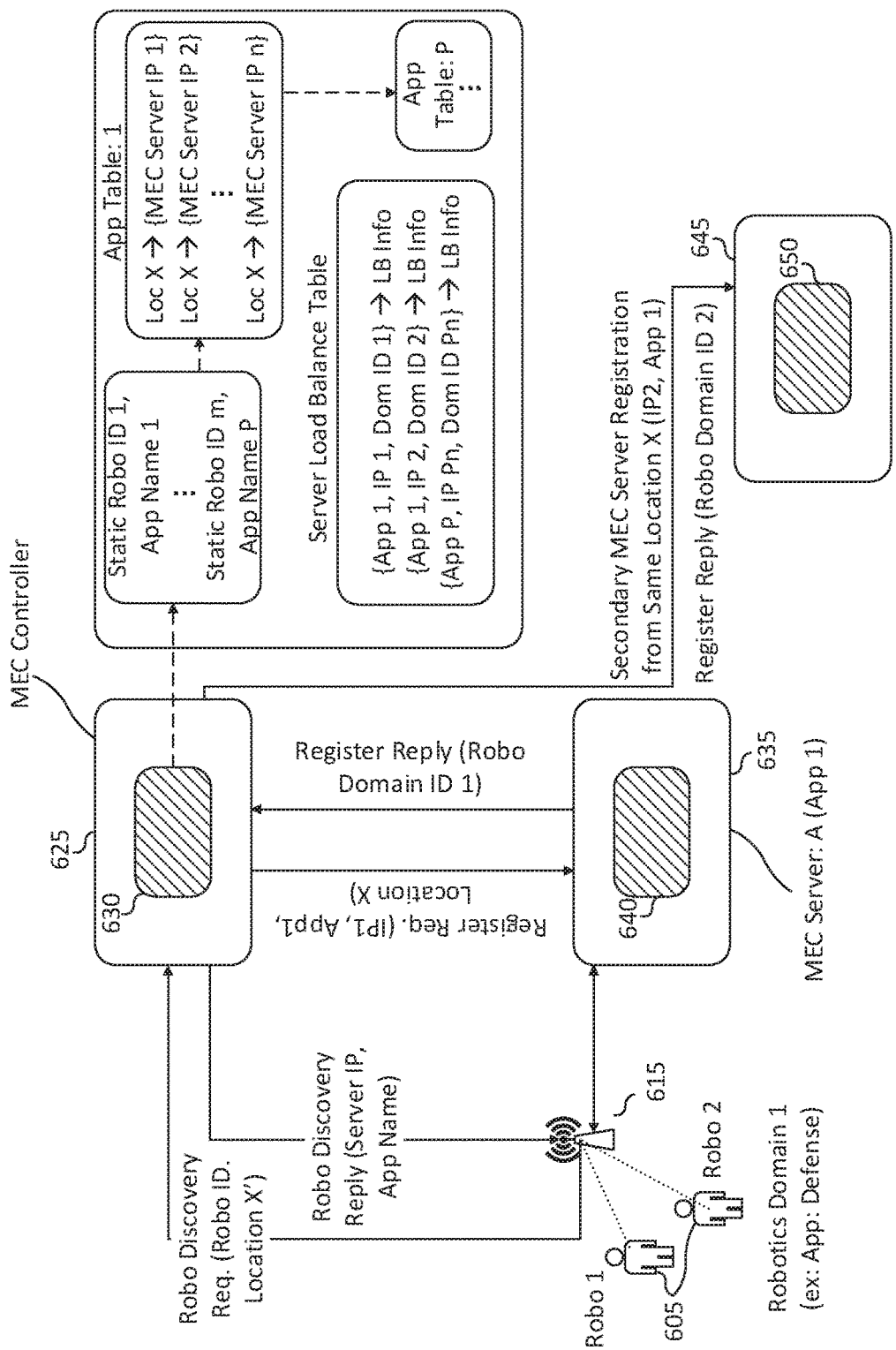
FIG. 6 illustrates another exemplary communication system architecture, in accordance with an embodiment of the present invention.

FIG. 6 illustrates another exemplary communication system architecture, in accordance with an embodiment of the present invention. In some embodiments of the present invention the communication system may include for example, and without limitation, a multiplicity of robots, wherein a sampling may be denoted as a first grouping 605. The communication system may further include a first cellular network 615, a MEC controller 625, an operating application controller master database 630, a first MEC server 635, a first operation application database 640, a second MEC server 645, and a second operation application server 650, wherein the operating application controller master database may store communication system data organized in a multiplicity of tables. Furthermore, the multiplicity of tables may include, and without limitation, operating application tables, device registration tables, and server load balance tables. The present embodiment illustrates an exemplary robotics application auto discovery mechanism. The auto discovery mechanism may include two parts. A first part shows details on how first and second MEC servers 635 and 645, respectively, register with the MEC controller 625. The second part show details of how individual robots of first grouping 605 from a Robo Domain register with MEC controller 625.

Figure 7:
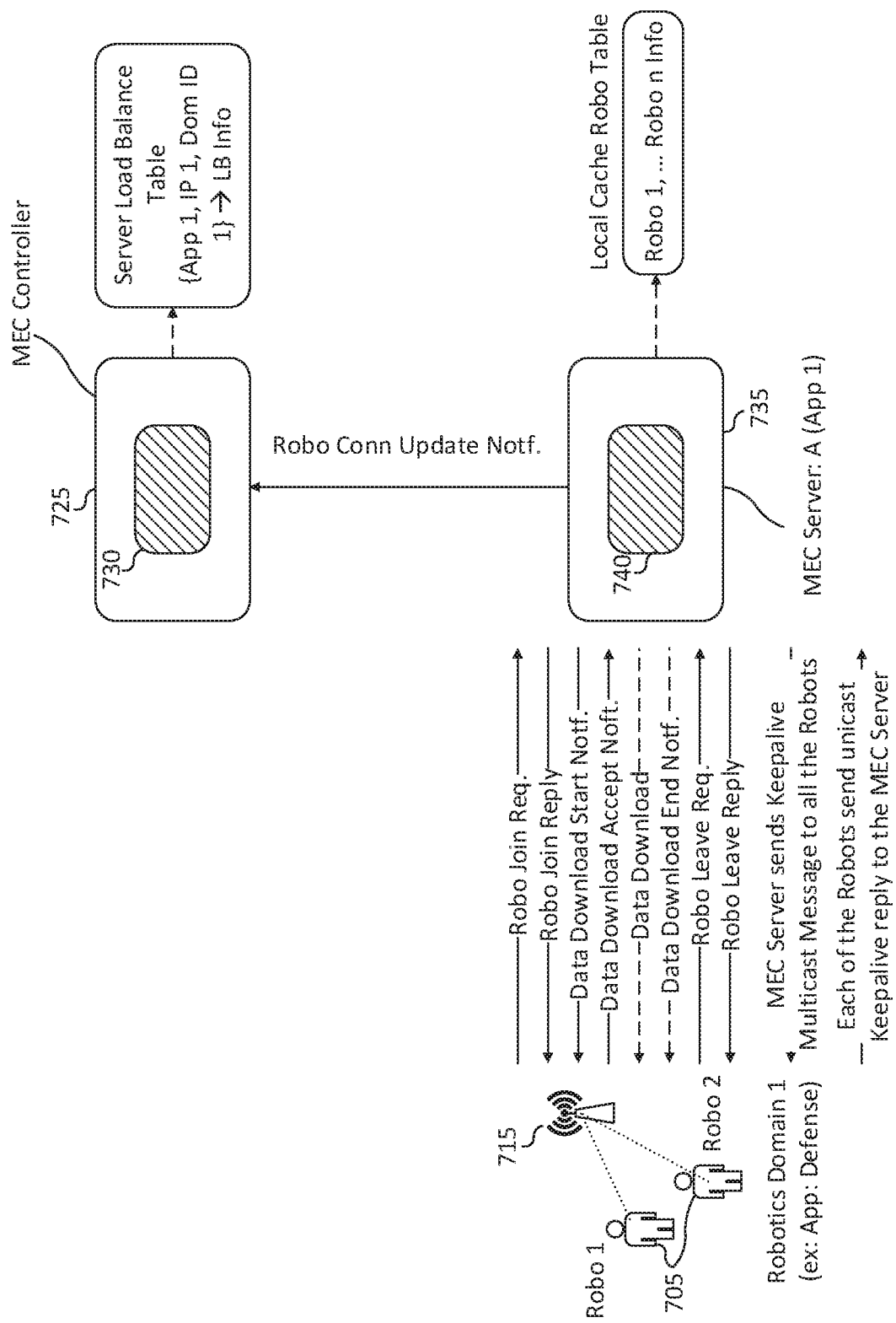
FIG. 7 illustrates another exemplary communication system architecture, in accordance with an embodiment of the present invention.

FIG. 7 illustrates another exemplary communication system architecture, in accordance with an embodiment of the present invention. In some embodiments of the present invention the communication system may include for example, and without limitation, a multiplicity of robots, wherein a sampling may be denoted as a first grouping 705. The communication system may further include a first cellular network 715, a MEC controller 725, an operating application controller master database 730, a first MEC server 735, and a first operation application database 740, wherein the operating application controller master data base may store communication system data organized in a multiplicity of tables. Furthermore, the multiplicity of tables may include, and without limitation, operating application tables, device registration tables, and server load balance tables. The present embodiment illustrates an exemplary robot registration with first MEC server 735.

Figure 8:
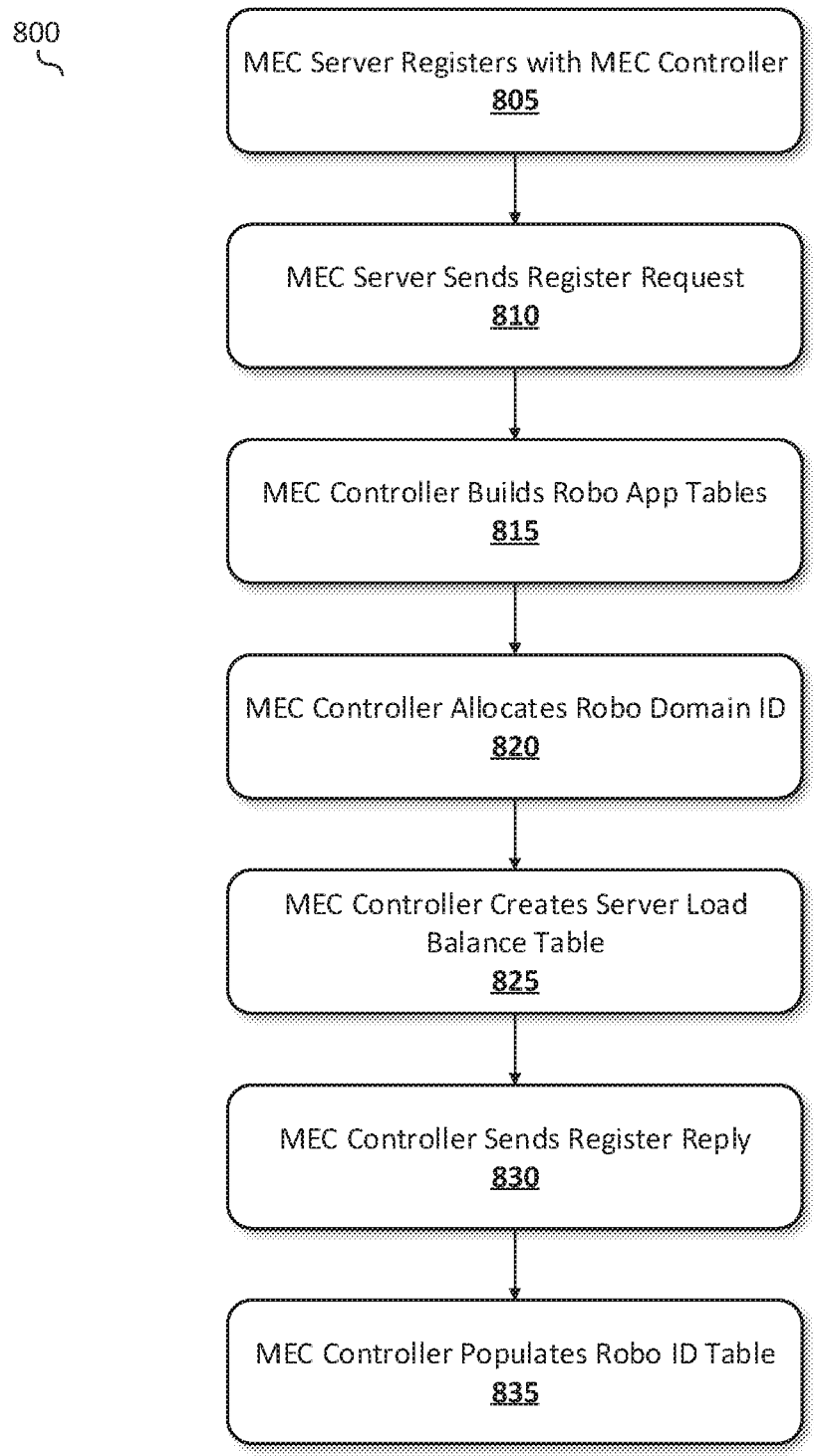
FIG. 8 illustrates a flowchart of an exemplary method of MEC server registration, in accordance with an embodiment of the present invention.

FIG. 8 illustrates a flowchart of an exemplary method of MEC server registration, in accordance with an embodiment of the present invention. In the present embodiment, with reference to FIG. 8, a process 800 starts at a step 805 where the MEC server hosting robotics applications may register with the MEC Controller. In some embodiments the MEC server may "statically" be given the controller IP address to establish communications. In a step 810 the MEC server may send a register request with, but not limited to, its IP, Robo application name it is servicing and its location X to the MEC controller. In a step 815 the MEC Controller may build Robo App tables as it gets the register requests from different MEC servers. The controller may add the MEC server location and IP on the Robo App table it belongs. In a step 820 the MEC Controller may allocate a unique Robo Domain ID for each MEC server that registers with it. In a step 825 the MEC controller may create a server load balance table with, but not limited to, Application Name, MEC Server IP, Unique Domain ID assigned to each server. This combination may define unique MEC server in the controller "server load balance" table. In a step 830 the MEC Controller may send a register reply after it finishes the MEC server registration. The registration reply may contain, without limitation, Robo Domain ID. The domain ID may be virtually representing the group of robots that may join with the MEC server. In a step 835 the MEC controller may also be populated with, but not limited to, Robo ID and the associated Robo application name "statically" in the Robo ID Table. The controller may map Robo ID Table with the App Table where it may find the MEC server IP based on the location.

Figure 9:
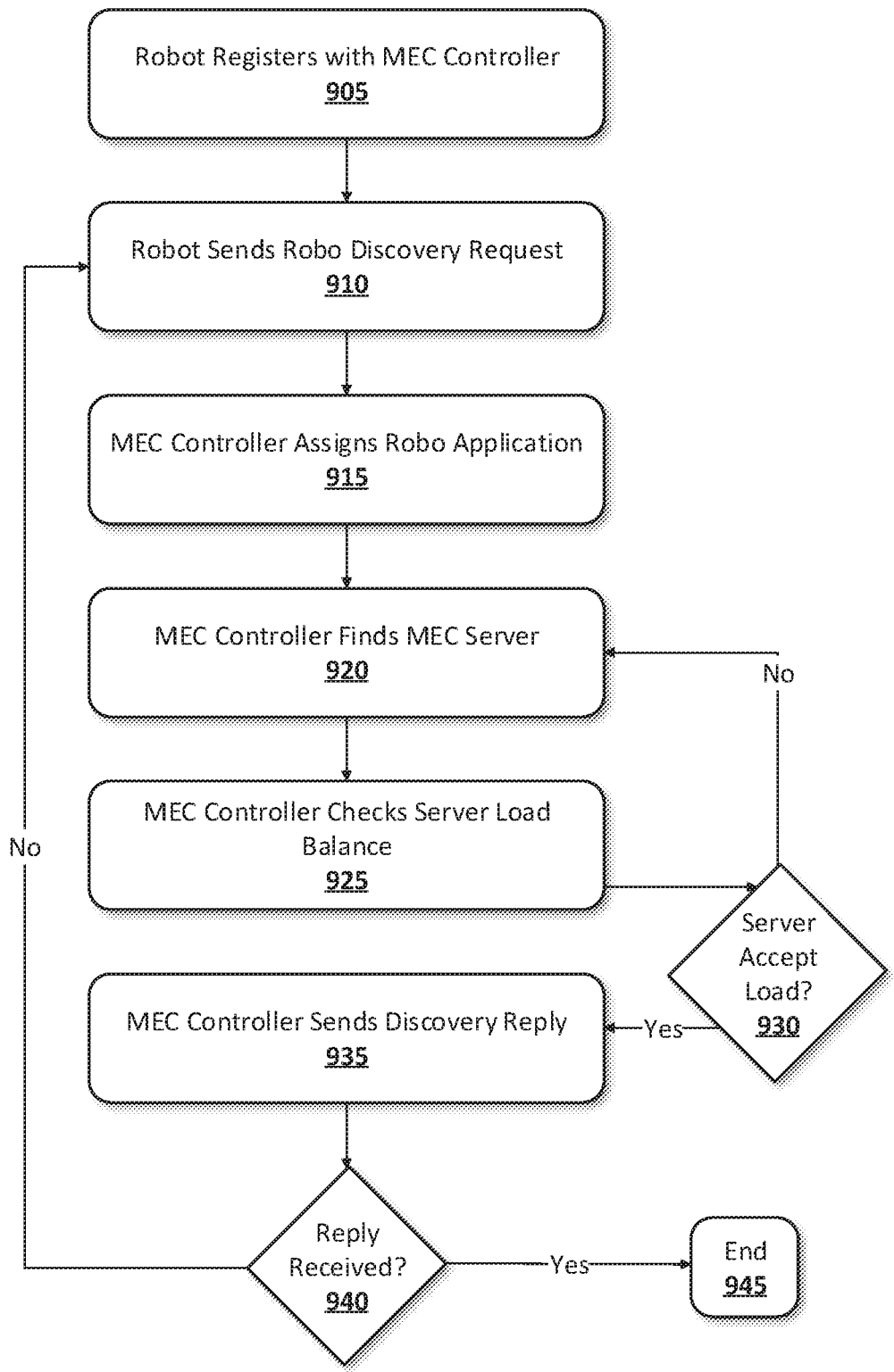
FIG. 9 illustrates a flowchart of an exemplary method of MEC server registration, in accordance with an embodiment of the present invention.

FIG. 9 illustrates a flowchart of an exemplary method of MEC server registration, in accordance with an embodiment of the present invention. In the present embodiment, with reference to FIG. 6, a process 800 starts at a step 805 where individual robots, once powered on, may register with the MEC controller. The individual robots may "statically" be given the controller IP address to establish communication with it. Each individual Robot may have a unique Robo ID. Once the individual robot is turned on, an on-board program may be executed to send a Robo discovery request to the MEC controller in a step 910. Once the MEC controller receives the Robo discovery request it may search the in its Robo ID database. Once it finds the match in its Robo ID table it may assign the Robo application for this Robo ID in a step 915. The MEC controller may decide on the Robo application that may be serviced by the robot which sends out the Robo discovery request. Based on the assigned Robo application, the MEC controller may find the correct MEC server from the Robo App Table. In a step 920, once the controller knows the correct Robo application for the registering robot, it may try to find out the right MEC server based on the nearest location match that came with Robo discovery request. Once the MEC controller finds the correct MEC server for the registering robot, it may finally check in its "Server Load Balance" table to make sure the MEC server may accept a new registration in a step 925. In a step 930 if the controller finds that the assigned MEC server may no longer accept a new connection based on its "Server Load Balance" table it my go back to step 920 and search for the second nearest MEC server from the Robo Application Table. This process may continue until the controller finds the correct MEC server for the registering robot based on its location which may accept a new connection. In a step 940, the MEC Controller may send a Robo discovery reply with, but not limited to, MEC server IP, and App Name to the robot in response to Robo discovery request once it successfully finds the right MEC server. In a step 940, if the registering robot may not receive successful Robo discovery reply within certain timeout period it would keep trying to send Robo discovery request step 910 periodically until it receives a successful Robo discovery reply. The process ends at a step 945.

Figure 10:
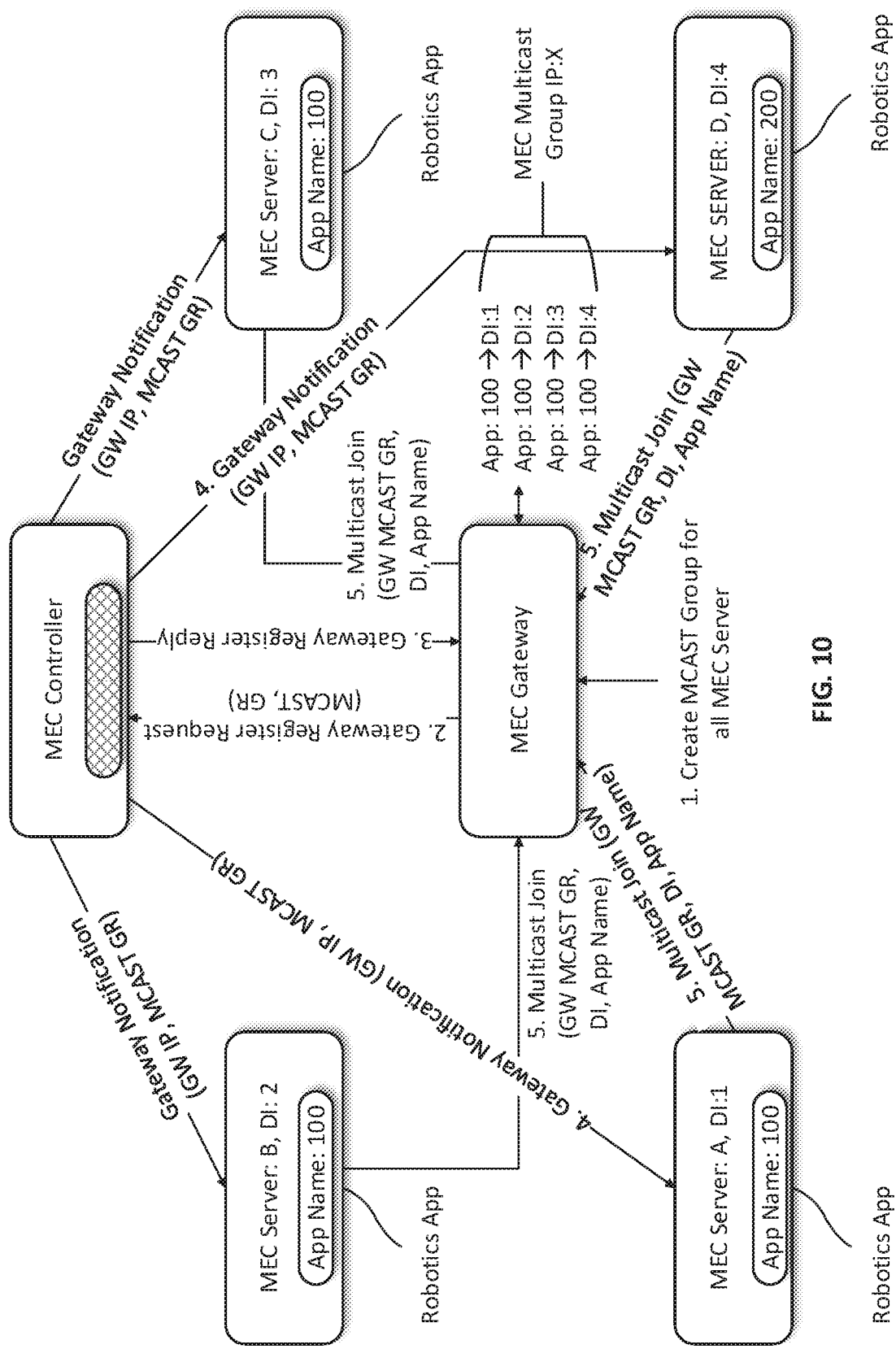
FIG. 10 illustrates an exemplary method of a MEC gateway registration with a MEC controller and MEC servers, in accordance with an embodiment of the present invention.

FIG. 10 illustrates an exemplary method of a MEC gateway registration with a MEC controller and MEC servers, in accordance with an embodiment of the present invention. In the present embodiment, the MEC Gateway may be connected with multiple different MEC Servers, in this example four MEC servers may be connected with the gateway but there is no limitation on how many MEC Servers may connect with the MEC gateway. The MEC gateway may establish initial communication with the MEC controller. The gateway may be statically given the controller IP address to initiate communications. The MEC gateway may internally create a Multicast Group for the MEC servers it wants to serve. The MEC gateway may start the registration process with MEC controller. The MEC gateway may send "Gateway Register Request (MCAST GR)" to the MEC controller. The register request may contain the Multicast Group address it created to serve the MEC servers. Once the MEC controller gets the gateway register request it may locally cache Gateway Multicast Group address and gateway IP address. The MEC controller may send the "Gateway Register Reply" to the MEC gateway acknowledging that it received all the necessary information from the gateway. If the MEC gateway doesn't receive this acknowledgement from the controller it may retry with the gateway register request. Once the Steps 1, 2 and 3 are done, The MEC controller may send the "Gateway Notification (GW IP, MCAST GR)" to all the MEC servers registered with the controller. This Notification may notify the MEC servers about gateway's IP and the Multicast Group the gateway has created for the servers. Once the MEC servers get the Gateway Notification from the MEC controller it may locally cache the gateway IP address and Multicast Group address. At this point, the MEC servers may send the "Multicast Join" request for the Multicast Group address it received from the controller to the MEC gateway. It may also send MEC server Robo Domain ID and Robo App Name to the MEC gateway. The MEC gateway at this point may create the Multicast Group with all the MEC servers joined with the MEC gateway. The gateway may also create a locale database for each Multicast Group with Robo Domain ID and Robo App Name mapping. This database may be used by the gateway later to forward the Robo State Update Notification from one MEC servers to the others.

Figure 11:
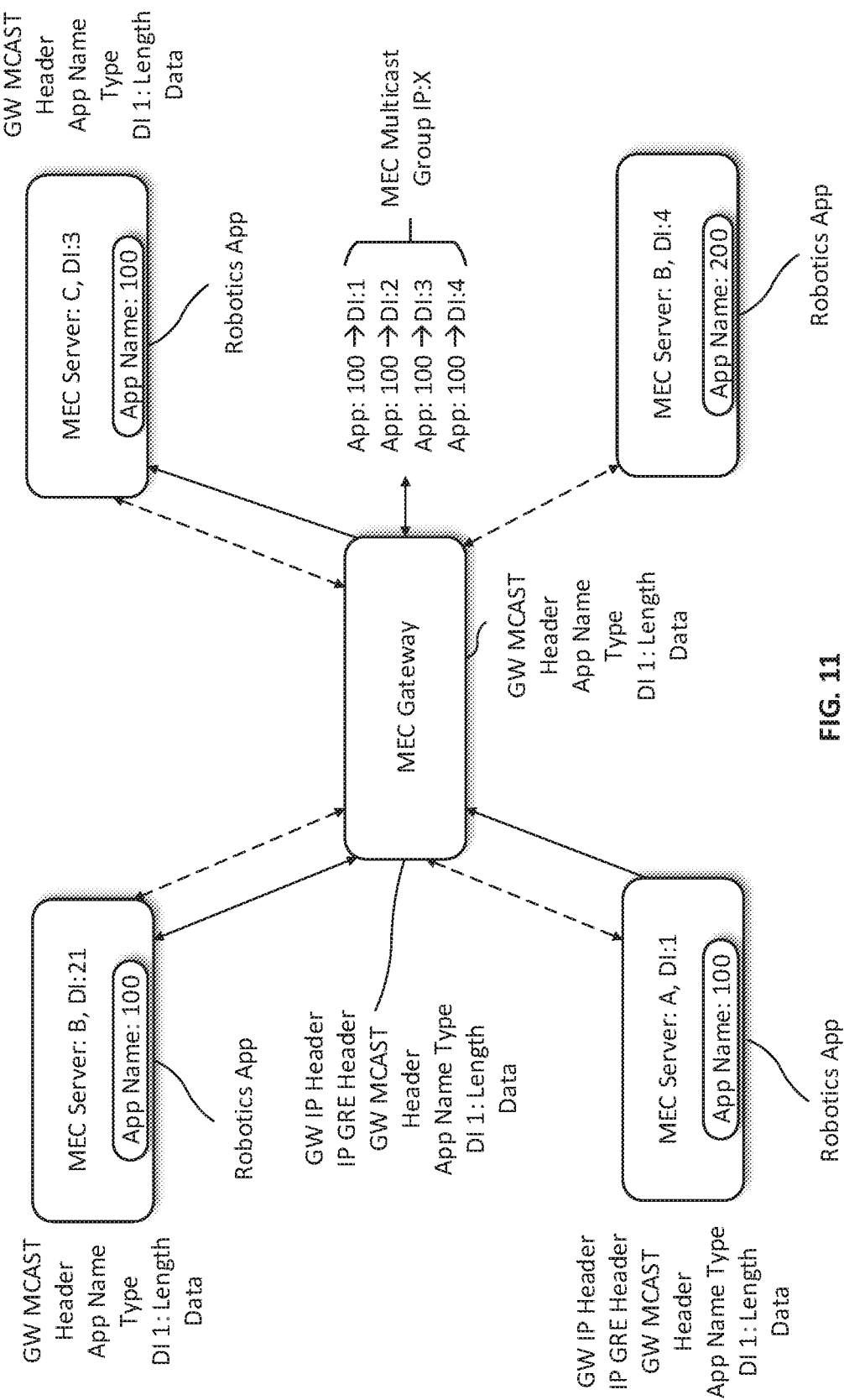
FIG. 11 illustrates an exemplary method of a MEC server to server communication through the MEC gateway, in accordance with an embodiment of the present invention.

FIG. 11 illustrates an exemplary method of a MEC server to server communication through the MEC gateway, in accordance with an embodiment of the present invention. In the present embodiment, there may be four MEC servers connected through the MEC gateway and all joined to the Multicast Group the MEC gateway has created before. Each MEC server may represent different Robo domains. In the present non-limiting example, the MEC servers A, B, C and D may be assigned with Robo Domain ID 1, 2, 3 and 4 respectively from the MEC controller during MEC server to MEC controller registration. Each MEC server may represent different sets of robots that may be all joined with it during robot to MEC server registrations. Once the MEC server may decide to send an update for the other servers, it may form a Robo Update Packet to send it to the MEC gateway and then the rest may be taken care or by the gateway. In a non-limiting example, the MEC server A, running with "Robo App: A", decided to send an update to the MEC gateway. The state update from each MEC Server may contain the following format {App Name, Type, DI, Length, Data} where:

App Name: Robo App Name.

Type: Internal State Type. Based on the Robo App, the application can define the different types of databases based on the Robo Application it is serving.

DI: Unique Robo Domain ID.

Length: Length of the Robo Application state data.

Data: Actual Data or State information.

The MEC Server may create the state update IP packet with Multicast Group address the gateway may have created, own source IP address. It may then encapsulate the IP packet with unicast destination address of the gateway and own source IP address. It may need to add IP GRE header for encapsulation reason, the GRE protocol may point to the inner packet is IP packet. The MEC server IP packet may go to the MEC gateway over internet as the destination IP address is the gateway. The gateway may decapsulate the packet and may find the inner packet is for the Multicast Group address it created for the MEC servers state update information propagation. The gateway may do packet inspection to see the Robo App Name in the state update packet. The gateway may do IP Multicast lookup in its own forwarding table to find out what are the MEC servers registered with it. After finding the list of MEC servers, it may check the Robo App Name from the state update packet and may lookup if there are any MEC servers registered for the same Robo App Name. If MEC gateway finds the matching Robo App Name for the other MEC servers registered with the same Multicast Group it may forward the MEC state update packet to those servers only. In the present example, there are four MEC servers registered with the MEC gateway with their Robo Domain ID, App Name for the Multicast Group the gateway has created. The three MEC servers A, B and C may be running with same Robo App: 100, whereas server D may be running with Robo App: 200. When MEC server A sends the Robo Update Notification packet to other MEC servers, the gateway may receive the update packet and may find all the MEC servers registered for the Multicast Group. MEC gateway may do the inspection in the update notification packet to find the App Name: 100 and from the App Name: 100 the gateway may find the Robo Domain IDs for the different MEC servers. The gateway may find only DI:1, 2 and 3 are matching with Robo App: 100. Based on the DI and skipping source, the gateway may only pick MEC servers B and C to multicast the update notification. Once MEC servers B and C receive the Robo Update Notification packet, each server may inspect the update packet. It may find the Internal State Type internal state type, length of the data and actual update data. Based on this information, the MEC server may update its internal state database. The MEC server may decide based on the update if the information needs to be broadcasted to all the robots connected to the MEC server. If the information needs to be updated to the individual robots, MEC server may take the necessary action to forward/push the information to all the robots it represents.

It may be contemplated that in many embodiments the robots may not be tied with any Robo Application. The robots may become universal as Robo Application or the intelligence move to the MEC server and/or cloud data center instead of running those directly in the individual Robots. The MEC controller and MEC server controlling the group of robots or Robo Domain may decide which Robo Application needs to be downloaded into the robots. The MEC controller may maintain {Robo ID} to {Robo Application} mapping to decide which Robo Application a robot may be serving. That mapping may easily be updated to move {Robo ID} from {Robo App 1} to {Robo App 2}. As the robots may not be tied with the Robo Application the MEC server downloads Robo App to the robots and the MEC server may also instruct robots to wipe out the Robo App in the on-board cache. Then the robot may send the Robo Discover Request to the MEC controller to get associated with a different Robo App through a different MEC server. The robots may change their location, they may not be bound with a certain location and may get associated with a different MEC server through MEC controller registration to server the same Robo App or to serve a different Robo App. In a non-limiting example, a defense robot may be used for an agricultural robot, or an agricultural robot may be re-used for agricultural work in a different location, or an agricultural robot may be used for manufacturing or industrial or as a security guard or some other purposes through the MEC controller {Robo ID} mapping mechanism.

Figure 12:
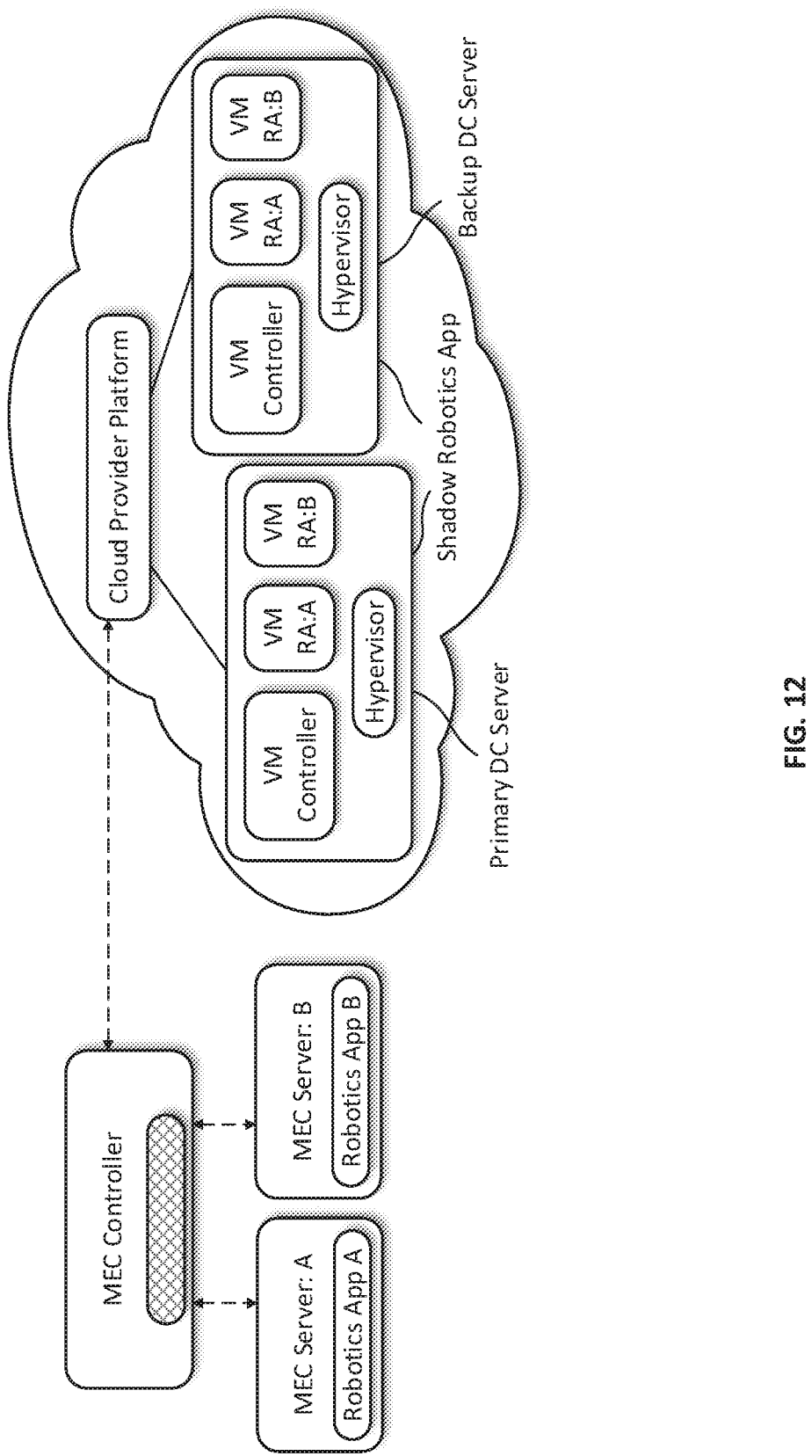
FIG. 12 illustrates an exemplary method of a MEC integration with a cloud provider platform, in accordance with an embodiment of the present invention.

FIG. 12 illustrates an exemplary method of a MEC integration with a cloud provider platform, in accordance with an embodiment of the present invention. In the present example, the provider platform may have internal network connections with the list of servers within the data center. The provider platform may decide the primary and backup servers. This may be done through manual configuration through a network operator.

Figure 13:
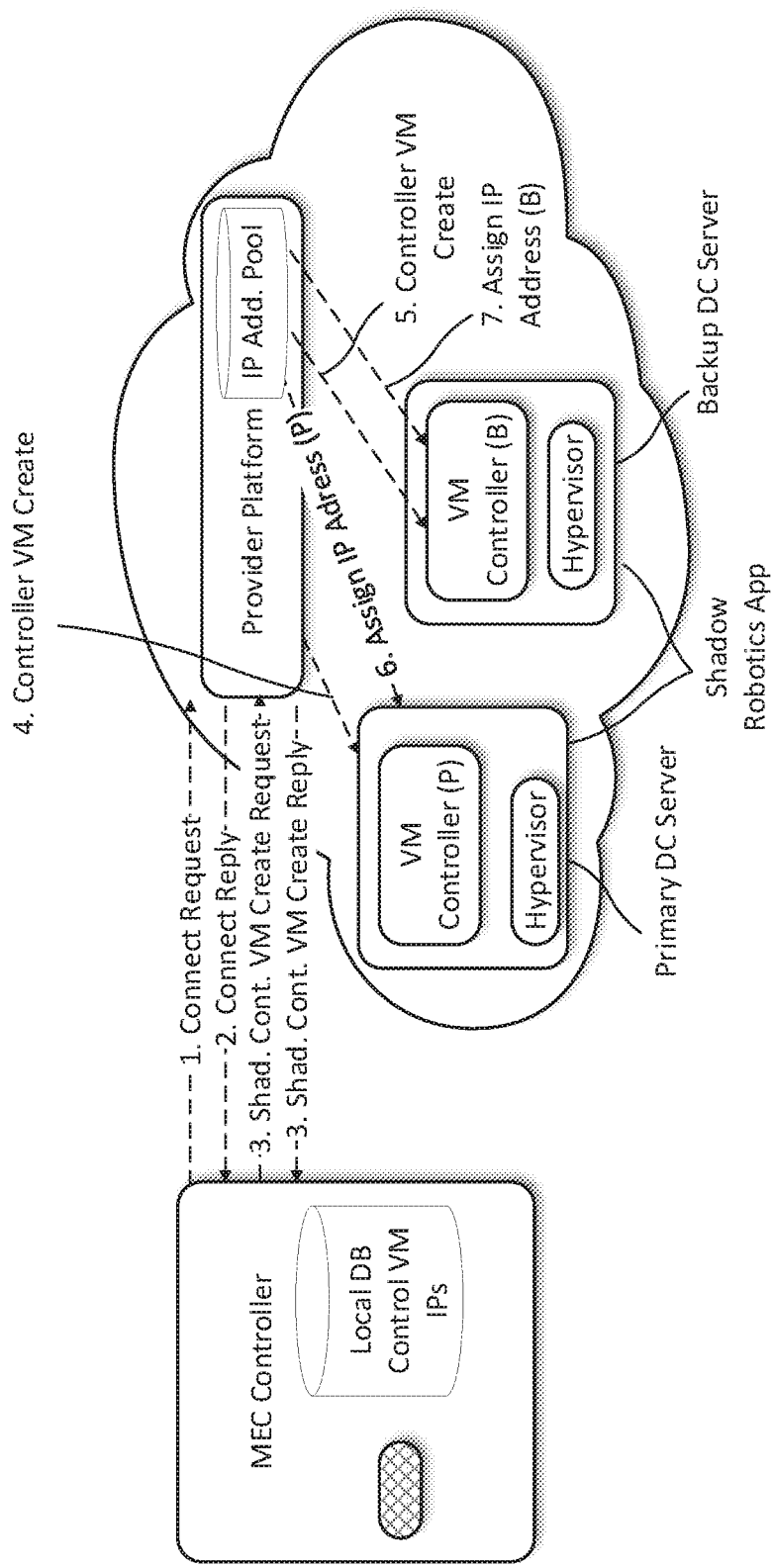
FIG. 13 illustrates an exemplary method of a MEC integration with a cloud provider platform, in accordance with an embodiment of the present invention.

FIG. 13 illustrates an exemplary method of a MEC integration with a cloud provider platform, in accordance with an embodiment of the present invention. In the present example, the MEC controller may be statically programmed by the network operator for the cloud provide platform IP address. Once the MEC controller is powered on it may send a connect request to the provider platform. The provider platform may send the Connect Reply to the MEC controller. At this point the connection between MEC controller and the provider platform may be ready. Once the initial handshake is done control messages may be exchanged to create a shadow control VM in the data center servers.

Figure 14:
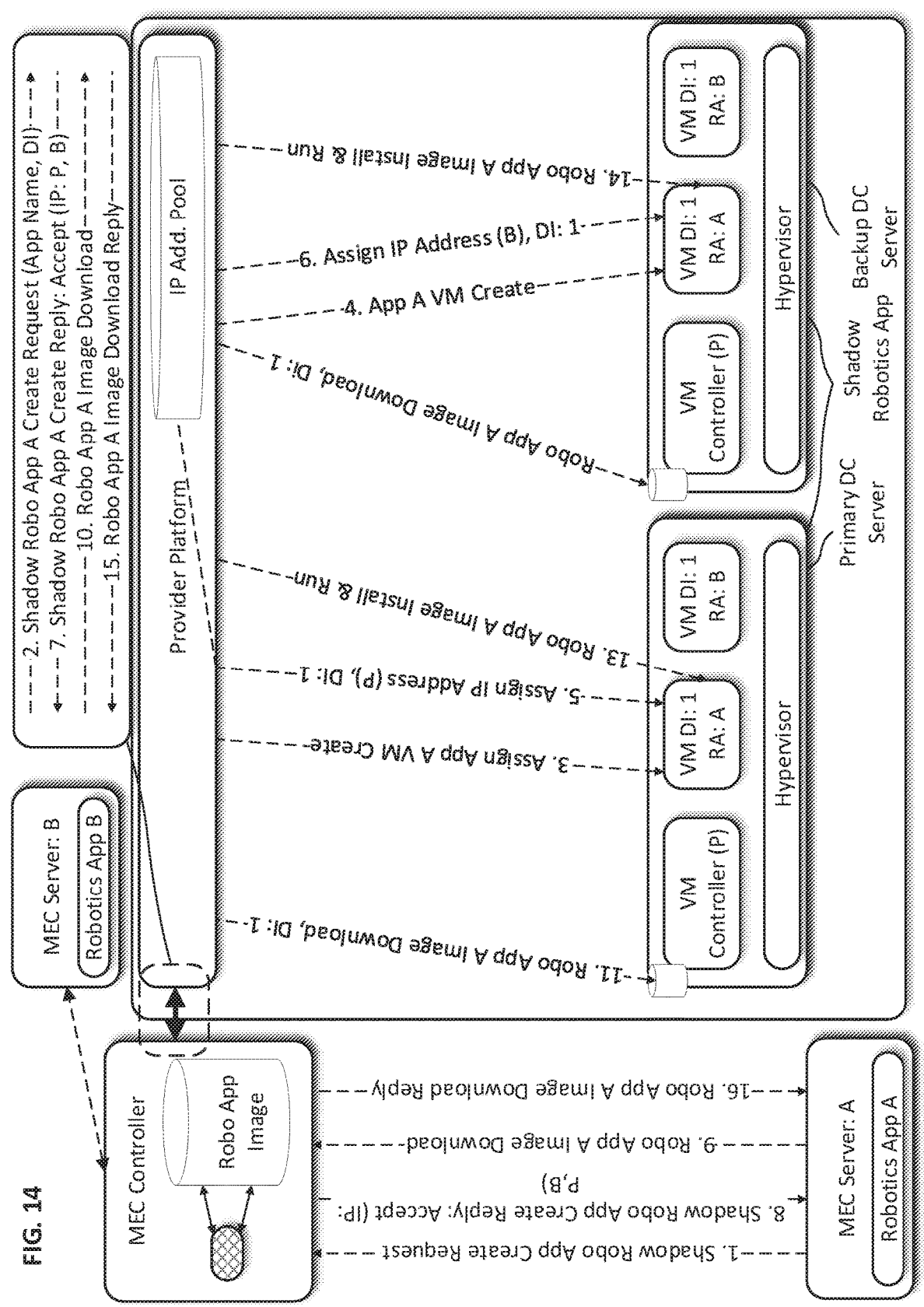
FIG. 14 illustrates an exemplary method of a MEC integration with a cloud provider platform, in accordance with an embodiment of the present invention.

FIG. 14 illustrates an exemplary method of a MEC integration with a cloud provider platform, in accordance with an embodiment of the present invention. In the present example, a MEC server may create a Shadow Robo Application data base.

Figure 15:
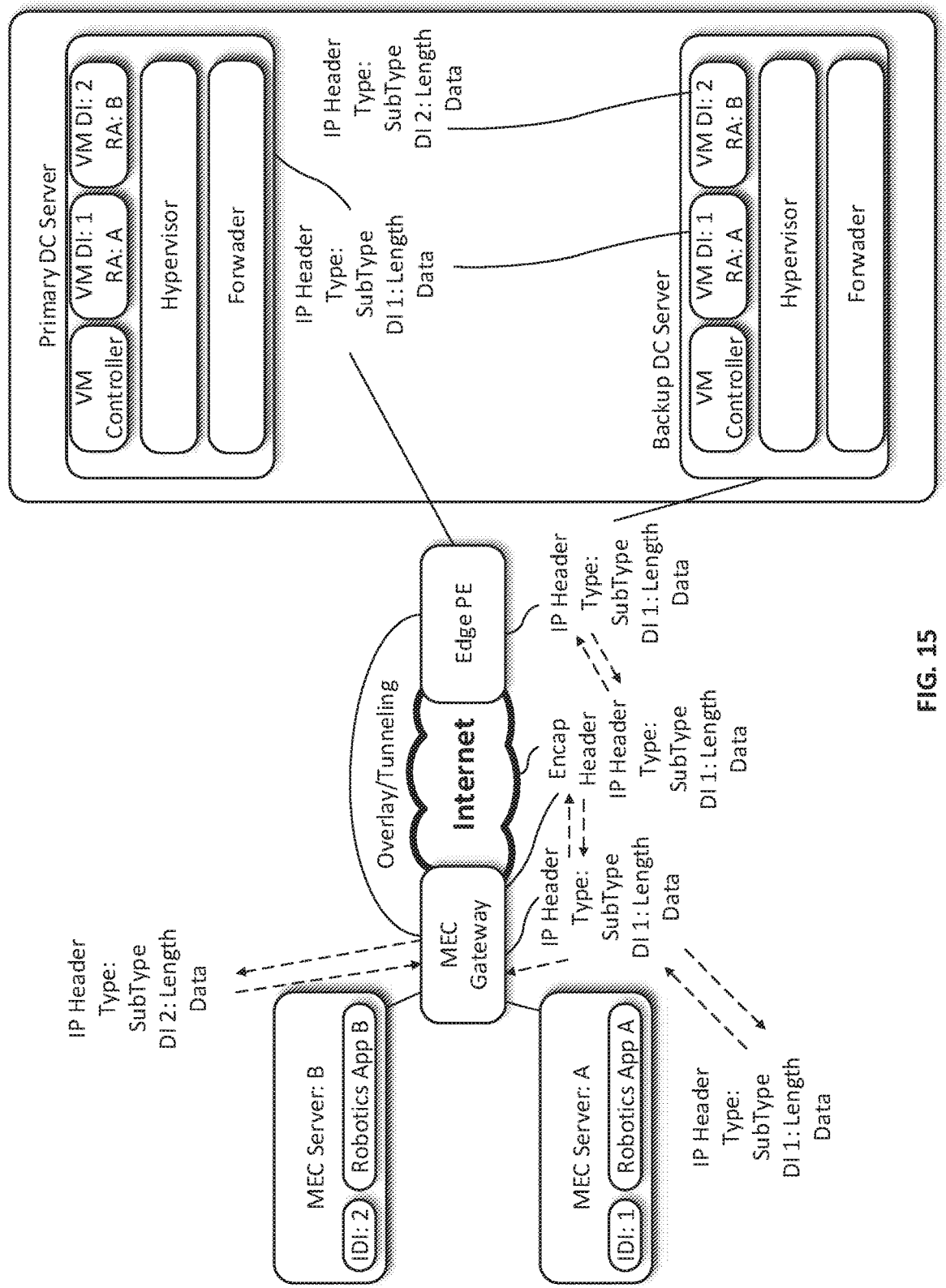
FIG. 15 illustrates an exemplary method of a Robo App state update in data center servers, in accordance with an embodiment of the present invention.

FIG. 15 illustrates an exemplary method of a Robo App state update in data center servers, in accordance with an embodiment of the present invention. The present example illustrates an exemplary Robo App state transition/update in the cloud data center servers.

Figure 16:
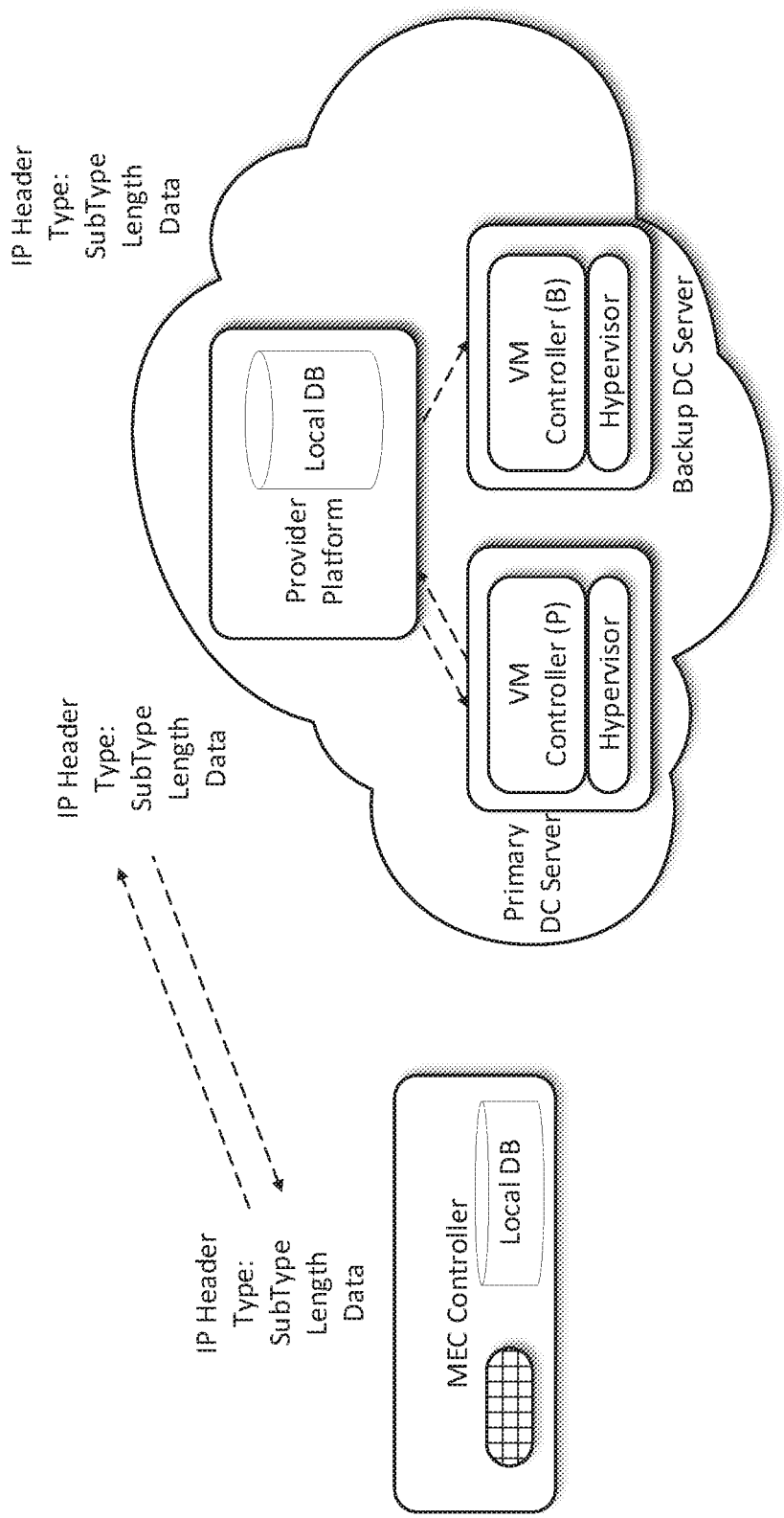
FIG. 16 illustrates an exemplary method of a MEC controller state update in data center servers, in accordance with an embodiment of the present invention.

FIG. 16 illustrates an exemplary method of a MEC controller state update in data center servers, in accordance with an embodiment of the present invention. The present example illustrates an exemplary MEC controller state transition/update in the cloud data center servers.

In some embodiments of the present invention MEC server may host robotics applications developed by a multiplicity of users. In some other embodiments of the present invention, individual clients may be operably coupled to MEC servers without the use of domains, thus clients may not be grouped by location information and operating application. In some other embodiments of the present invention, a MEC controller may not communicate with individual clients. In other embodiments a MEC gateway may not store or be aware of particular domains. In another embodiment a MEC server may assume all assigned clients have a particular cache size and may further only perform a same download to all robots. In some other embodiments the communication system may include a static configuration file which may be maintained by an operator/administrator, that may define robot to MEC Server connection information, wherein once a MEC Server exceeds a maximum number of connections the MEC server may reject any more connection coming to the MEC server, based on the configuration file, however the individual robots that may all be connected with certain MEC servers may still communicate through the MEC Server.

It may be contemplated that many embodiments including a MEC controller as described may optimally maintain a load for each MEC server in a network and further may provide a dynamic load balance mechanism. Furthermore, it may be contemplated that in some embodiments, individual robots may no longer need to be intelligent and sophisticated since most of a robot application specific intelligence may be moved in the MEC server. Moreover, in other embodiments each robot within a domain may share work with other robots. It may also be contemplated that the communication system of the present invention may allow most robots within a domain to be connected and may provide performance on a domain level rather than an individual robot level. It may further be contemplated that as a load may be shared across a domain, even if individual robot failure occurs (for unexpected reason or due to a mechanical failure), a domain performance may remain optimal.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

Figure 17:
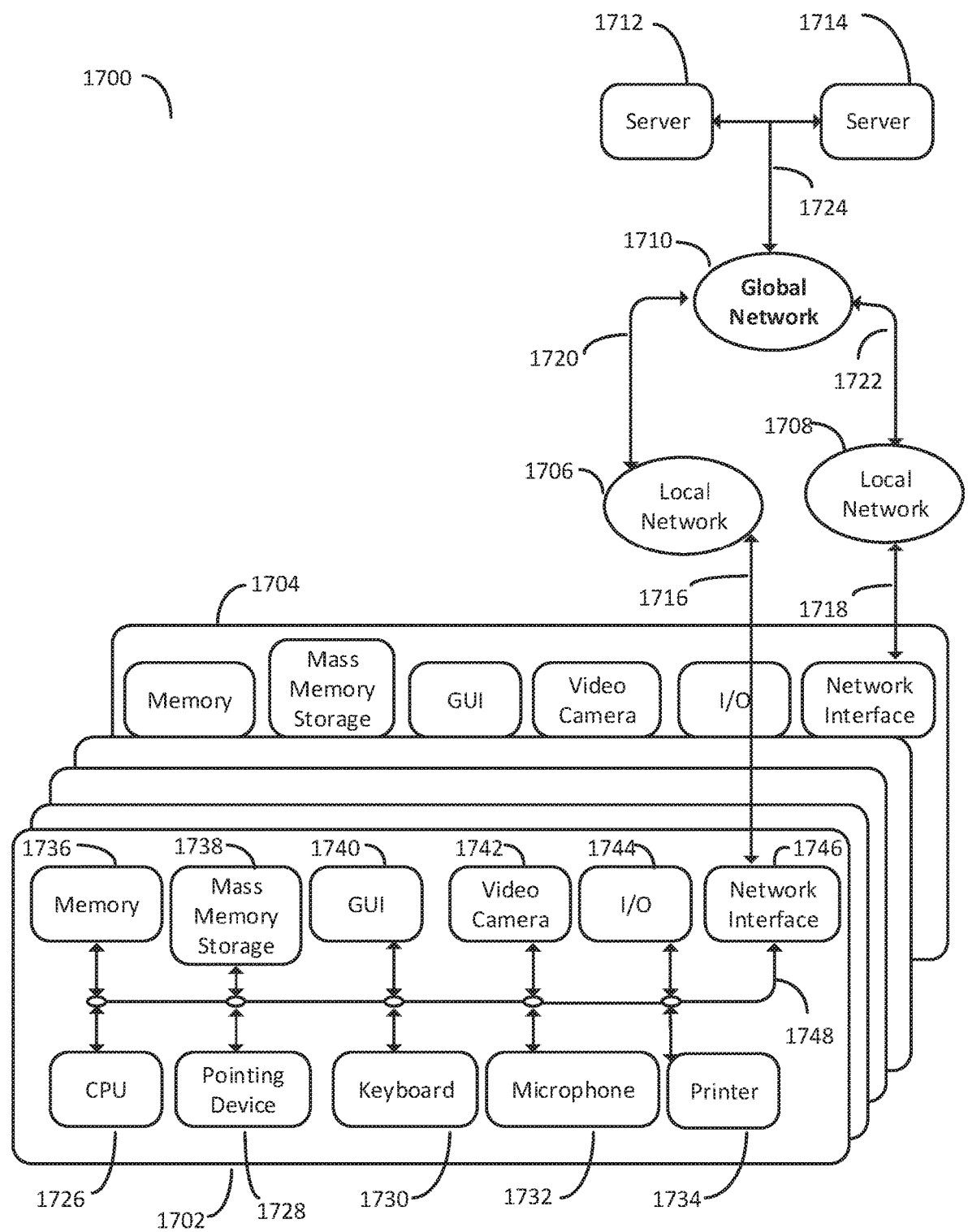
FIG. 17 illustrates a block diagram depicting an exemplary client/server system which may be used by an exemplary web-enabled/networked embodiment of the present invention.

FIG. 17 illustrates a block diagram depicting an exemplary client/server system which may be used by an exemplary web-enabled/networked embodiment of the present invention.

A communication system 1700 includes a multiplicity of clients with a sampling of clients denoted as a client 1702 and a client 1704, a multiplicity of local networks with a sampling of networks denoted as a local network 1706 and a local network 1708, a global network 1710 and a multiplicity of servers with a sampling of servers denoted as a server 1712 and a server 1714.

Client 1702 may communicate bi-directionally with local network 1706 via a communication channel 1716. Client 1704 may communicate bi-directionally with local network 1708 via a communication channel 1718. Local network 1706 may communicate bi-directionally with global network 1710 via a communication channel 1720. Local network 1708 may communicate bi-directionally with global network 1710 via a communication channel 1722. Global network 1710 may communicate bi-directionally with server 1712 and server 1714 via a communication channel 1724. Server 1712 and server 1714 may communicate bi-directionally with each other via communication channel 1724. Furthermore, clients 1702, 1704, local networks 1706, 1708, global network 1710 and servers 1712, 1714 may each communicate bi-directionally with each other.

In one embodiment, global network 1710 may operate as the Internet. It will be understood by those skilled in the art that communication system 1700 may take many different forms. Non-limiting examples of forms for communication system 1700 include local area networks (LANs), wide area networks (WANs), wired telephone networks, wireless networks, or any other network supporting data communication between respective entities.

Clients 1702 and 1704 may take many different forms. Non-limiting examples of clients 1702 and 1704 include personal computers, personal digital assistants (PDAs), cellular phones and smartphones.

Client 1702 includes a CPU 1726, a pointing device 1728, a keyboard 1730, a microphone 1732, a printer 1734, a memory 1736, a mass memory storage 1738, a GUI 1740, a video camera 1742, an input/output interface 1744 and a network interface 1746.

CPU 1726, pointing device 1728, keyboard 1730, microphone 1732, printer 1734, memory 1736, mass memory storage 1738, GUI 1740, video camera 1742, input/output interface 1744 and network interface 1746 may communicate in a unidirectional manner or a bi-directional manner with each other via a communication channel 1748. Communication channel 1748 may be configured as a single communication channel or a multiplicity of communication channels.

CPU 1726 may be comprised of a single processor or multiple processors. CPU 1726 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1736 is used typically to transfer data and instructions to CPU 1726 in a bi-directional manner. Memory 1736, as discussed previously, may include any suitable computer-readable media, intended for data storage, such as those described above excluding any wired or wireless transmissions unless specifically noted. Mass memory storage 1738 may also be coupled bi-directionally to CPU 1726 and provides additional data storage capacity and may include any of the computer-readable media described above. Mass memory storage 1738 may be used to store programs, data and the like and is typically a secondary storage medium such as a hard disk. It will be appreciated that the information retained within mass memory storage 1738, may, in appropriate cases, be incorporated in standard fashion as part of memory 1736 as virtual memory.

CPU 1726 may be coupled to GUI 1740. GUI 1740 enables a user to view the operation of computer operating system and software. CPU 1726 may be coupled to pointing device 1728. Non-limiting examples of pointing device 1728 include computer mouse, trackball and touchpad. Pointing device 1728 enables a user with the capability to maneuver a computer cursor about the viewing area of GUI 1740 and select areas or features in the viewing area of GUI 1740. CPU 1726 may be coupled to keyboard 1730. Keyboard 1730 enables a user with the capability to input alphanumeric textual information to CPU 1726. CPU 1726 may be coupled to microphone 1732. Microphone 1732 enables audio produced by a user to be recorded, processed and communicated by CPU 1726. CPU 1726 may be connected to printer 1734. Printer 1734 enables a user with the capability to print information to a sheet of paper. CPU 1726 may be connected to video camera 1742. Video camera 1742 enables video produced or captured by user to be recorded, processed and communicated by CPU 1726.

CPU 1726 may also be coupled to input/output interface 1744 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1726 optionally may be coupled to network interface 1746 which enables communication with an external device such as a database or a computer or telecommunications or internet network using an external connection shown generally as communication channel 1716, which may be implemented as a hardwired or wireless communications link using suitable conventional technologies. With such a connection, CPU 1726 might receive information from the network, or might output information to a network in the course of performing the method steps described in the teachings of the present invention.

Many embodiments of the present invention attempt to address robotic solutions through virtualizing robot applications in a MEC Server, wherein the MEC server may sit edge of a cellular network and may be capable of running robo applications and downloading applications to each individual robots within a robo domain. It may be contemplated that the individual robots may no longer need to be super intelligent. It may further be contemplated that fewer computing resources may be need in the individual robots, therefore cost and production time of each individual robot may be decreased.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation, clients, and MEC server, controllers and gateways.

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breathe life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a client communication system according to the present invention will be apparent to those skilled in the art. Various aspects of the invention have been described above by way of illustration, and the specific embodiments disclosed are not intended to limit the invention to the particular forms disclosed. The particular implementation of the client communication may vary depending upon the particular context or application. By way of example, and not limitation, the client communication system described in the foregoing were principally directed to an MEC integrated cloud communication network for controlling robots implementations; however, similar techniques may instead be applied to controlling vehicles such as cars that drive themselves, drone air planes, construction and industrial vehicles, or any other robotic devices related to for example and without limitation, defense, agricultural, and/or industrial robots, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A method comprising the steps of:
    communicating, from a client, with a mobile edge computing (MEC) server, the MEC server at least being configured to be in control of a heterogeneous domain;
    requesting, by the client, to join the heterogeneous domain, the MEC server at least being configured for:
        determining an on-board cache size of the client;
        determining a download size for the client; and
        transmitting a download to the client, the download at least comprising:
            an application,
            an operating database, and
            a size at least partially being determined by the download size;
    receiving the download;
    executing at least one task at least partially being determined by the download;
    communicating, from the client, with a MEC controller, wherein the MEC server is operably coupled to the MEC controller via a server-controller communication channel, wherein the MEC controller has an operating application controller master database that stores a multiplicity of tables, including operating application tables storing one or more operating applications, device registration tables, and server load balance tables, any one or more of which at least partially comprise indexed client registration information and communication system data, both of which are used to maintain an optimal load balance, wherein data of the server load balance tables is used to ensure that the MEC server does not exceed a predetermined number of client communicational connections, and further wherein the MEC server executes at least a selective download of one or more operating applications to the client at least partially based on the on-board cache size of the client;
    sending, by the client, a discovery request to the MEC controller; and
    receiving a discovery reply from the MEC controller, the MEC controller being at least configured for:
        assigning the application to the client;
        determining the MEC server for the client; and
        transmitting the discovery reply to the client, the discovery reply at least comprising an identification for the MEC server for the client.

2. The method as recited in claim 1, further comprising the step of:
    transmitting a response of said executing to the MEC server.

3. The method as recited in claim 2, further comprising the step of:
receiving a command action reply from the MEC server in response to said transmitting the response.

4. The method as recited in claim 3, further comprising the step of:
transmitting a command refuse signal to the MEC server.

5. The method as recited in claim 1, in which the MEC server is further configured for:
communicating with a MEC gateway for communicating with additional MEC servers for interconnecting heterogeneous domains.

6. The method as recited in claim 1, in which the MEC server is further configured for
client to client communications.

7. The method as recited in claim 1, in which the client comprises:
a robot.

8. A method consisting the steps of:
communicating, from a client, with a MEC server in control of a heterogeneous domain;
requesting, by the client, to join the heterogeneous domain of the MEC server;
determining an on-board cache size of the client
receiving, by the client, a download from the MEC server; and
executing, by the client, at least one task at least partially being determined by the download;
transmitting a response of said executing to the MEC server;
receiving a command action reply from the MEC server in response to said transmitting the response;
transmitting a command refuse signal to the MEC server;
communicating, from the client, with a MEC controller, wherein the MEC server is operably coupled to the MEC controller via a server-controller communication channel, wherein the MEC controller has an operating application controller master database that stores a multiplicity of tables, including operating application tables storing one or more operating applications, device registration tables, and server load balance tables, any one or more of which at least partially comprise indexed client registration information and communication system data, both of which are used to maintain an optimal load balance, wherein data of the server load balance tables is used to ensure that the MEC server does not exceed a predetermined number of client communicational connections, and further wherein the MEC server executes at least a selective download of one or more operating applications to the client at least partially based on the on-board cache size of the client;
sending a discovery request to the MEC controller; and
receiving a discovery reply from the MEC controller, in which the MEC controller being at least configured for:
assigning an application from the operating application tables to the client
determining a MEC server for the client and
transmitting the discovery reply to the client, the discovery reply at least comprising an identification for the MEC server for the client, in which the MEC server is further configured for communicating with a MEC gateway for communicating with additional MEC servers for interconnecting heterogeneous domains and client to client communications, in which the client comprises a robot.

9. A non-transitory computer-readable storage medium with an executable program stored thereon, wherein the program instructs one or more processors to perform the following steps:
communicating, from a client, with a MEC server as a client, the MEC server at least being configured to be in control of a heterogeneous domain;
requesting, by the client, to join the heterogeneous domain of the MEC server, the MEC server at least being configured for:
determining an on-board cache size of the client;
determining a download size for the client; and
transmitting a download to the client, the download at least comprising an application, an operating database, and a size at least partially being determined by the download size;
receiving the download;
executing at least one task at least partially being determined by the download; and
communicating, from the client, with a MEC controller, wherein the MEC server is operably coupled to the MEC controller via a server-controller communication channel, wherein the MEC controller has an operating application controller master database that stores a multiplicity of tables, including operating application tables storing one or more operating applications, device registration tables, and server load balance tables, any one or more of which at least partially comprise indexed client registration information and communication system data, both of which are used to maintain an optimal load balance, wherein data of the server load balance tables is used to ensure that the MEC server does not exceed a predetermined number of client communicational connections, and further wherein the MEC server executes at least a selective download of one or more operating applications to the client at least partially based on the on-board cache size of the client;
sending a discovery request to the MEC controller;
receiving a discovery reply from the MEC controller, the MEC controller being at least configured for:
assigning the application to the client
determining a MEC server for the client and
transmitting the discovery reply to the client, the discovery reply at least comprising an identification for the MEC server for the client.

10. The program instructing the one or more processors as recited in claim 9, further comprising the step of:
transmitting a response of said executing to the MEC server.

11. The program instructing the one or more processors as recited in claim 10, further comprising the step of:
receiving a command action reply from the MEC server in reply to said transmitting the response.

12. The program instructing the one or more processors as recited in claim 11, further comprising the step of
transmitting a command refuse signal to the MEC server.

13. The program instructing the one or more processors as recited in claim 9, further comprising the steps of:
transmitting a response of said executing to the MEC server; receiving a command action reply from the MEC server in response to said transmitting the response;
transmitting a command refuse signal to the MEC server;
communicating with a MEC controller;
sending a discovery request to the MEC controller; and receiving a discovery reply from the MEC controller, in which the MEC controller being at least configured for:
assigning the application to the client;
determining a MEC server for the client; and
transmitting the discovery reply to the client, the discovery reply at least comprising an identification for the MEC server for the client, in which the MEC server is further configured for communicating with a MEC gateway for communicating with additional MEC servers for interconnecting heterogeneous domains and client to client communications, in which the client comprises a robot.

* * * * *